US012487544B2

(12) United States Patent
Imaizumi et al.

(10) Patent No.: US 12,487,544 B2
(45) Date of Patent: Dec. 2, 2025

(54) FIXING APPARATUS AND FILM UNIT

(71) Applicant: CANON KABUSHIKI KAISHA, Tokyo (JP)

(72) Inventors: Toru Imaizumi, Kanagawa (JP); Takaaki Akamatsu, Kanagawa (JP); Hiroki Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/502,855

(22) Filed: Nov. 6, 2023

(65) Prior Publication Data

US 2024/0152080 A1 May 9, 2024

(30) Foreign Application Priority Data

Nov. 7, 2022 (JP) ................................ 2022-177774
Nov. 7, 2022 (JP) ................................ 2022-177775

(51) Int. Cl.
*G03G 15/20* (2006.01)

(52) U.S. Cl.
CPC ..... *G03G 15/2053* (2013.01); *G03G 15/2064* (2013.01); *G03G 2215/2029* (2013.01)

(58) Field of Classification Search
CPC ........... G03G 15/2017; G03G 15/2053; G03G 2215/2003
See application file for complete search history.

(56) References Cited

U.S. PATENT DOCUMENTS

2016/0170338 A1* 6/2016 Tateishi ............... G03G 15/206 399/329
2016/0252856 A1* 9/2016 Suzuki ............... G03G 15/2053 399/329

FOREIGN PATENT DOCUMENTS

JP 2013041062 A 2/2013
JP 2014238560 A 12/2014
JP 2021039148 A 3/2021
JP 2021076664 A 5/2021

* cited by examiner

*Primary Examiner* — Thomas S Giampaolo, II
(74) *Attorney, Agent, or Firm* — Canon U.S.A., Inc. IP Division

(57) ABSTRACT

A fixing apparatus includes a film, a guide member, a stay member, a roller, and a restriction structure. The guide member is disposed in an inside space of the film, elongated in a generatrix direction of the film, and guides rotation of the film. The stay member reinforces the guide member, the film and a roller form a fixing nip portion between the film and the roller, and a recording medium having a toner image is heated to fix the toner image at the fixing nip portion while a sheet passes through the fixing nip portion. The roller is disposed in contact with an outside surface of the film. The restriction structure restricts movement of the guide member in a direction orthogonal to the generatrix direction of the film and also in a direction in which the stay member and the guide member are separated from each other.

18 Claims, 19 Drawing Sheets

FIXING APPARATUS AND FILM UNIT

BACKGROUND

Field

The present disclosure relates to a fixing apparatus employing a film heating method.

Description of the Related Art

A known fixing apparatus used in an electrophotographic image forming apparatus (hereinafter referred to as an "image forming apparatus") heats and presses a recording medium carrying an unfixed image thereon in a fixing unit, thereby fixing the image onto the recording medium.

A type of fixing apparatus employing a film heating method, such as one described in Japanese Patent Laid-Open No. 2013-41062, is used widely because of short start-up time and energy saving for the image forming apparatus.

The fixing apparatus includes a ceramic heater, a fixing roller, and a heat-resistant fixing film. The fixing film is interposed between the ceramic heater and the fixing roller, and a fixing nip portion is formed between the fixing film and the fixing roller. A sheet having an unfixed toner image thereon is conveyed to the fixing nip portion, where the sheet is pinched and conveyed between the fixing film and the fixing roller, and the sheet is heated and pressed. The fixing apparatus thereby fixes the toner image onto the sheet as a "permanent" image.

FIGS. 9A to 9C outline a fixing apparatus employing the film heating method. FIG. 9A is a cross-sectional view of the fixing apparatus as viewed in the sheet-width direction, and FIG. 9B is a cross-sectional view of the fixing apparatus as viewed from the upstream side in the sheet conveyance direction. FIG. 9C is a front view of a film unit 51, from which a fixing film 53 is removed, as viewed from the upstream side in the sheet conveyance direction.

The fixing apparatus 50 includes a film unit 51 and a pressure roller 52. The film unit 51 and the pressure roller 52 form a pressure contact nip N.

The film unit 51 includes, as major components, a heater 54, a tubular film (fixing film) 53, and a heater holder 55. The film 53 rotates while in contact with the heater 54. The fixing film 53 and the heater 54 are supported by the heater holder 55. The heater holder 55 also serves as a guide member that guides the rotation of the fixing film 53. The heater holder 55 includes multiple ribs each having a curved surface that follows the inside surface of the fixing film 53. The film unit 51 also includes a pressure stay 56 that presses the heater holder 55 toward the pressure roller 52 that opposes the heater holder 55. Flanges 57 are disposed at opposite ends of the pressure stay 56 in the longitudinal direction. The flanges 57 serve as fitting members that engage the pressure stay 56.

In the film unit 51, the heater 54 fitted in the heater holder 55 is positioned between the heater holder 55 and the fixing film 53. The fixing film 53 is a heat-resistant film having a circular cross section. The film is loosely fitted around the heater holder 55.

The pressure roller 52 and the heater 54 form the pressure-contact nip portion N with the fixing film 53 interposed therebetween. The pressure roller 52 is a device configured to be in contact with the outside surface of the film and to rotationally drive the fixing film 53. The pressure roller 52 includes a metal core 52*a*, an elastic material layer 52*b* made of, for example, silicone rubber, and an outermost releasing layer 52*c*. The pressure roller 52 is in press contact with the surface of the heater 54 with the fixing film 53 interposed therebetween. A bearing device and an urging device (not illustrated) exert a predetermined pressing force to the pressure roller 52. A motor (not illustrated) rotates the pressure roller 52, and the pressure roller 52 moves the fixing film 53 due to the friction between the pressure roller 52 and the outside surface of the fixing film 53.

Pressure springs (not illustrated) exert pressing forces to respective flanges 57 of the film unit 51 in the direction of arrow B. The flanges 57 serve to transfer the pressing forces to the pressure-contact nip portion N via the pressure stay 56. The flanges 57 also serve to restrict the displacement of the film 53 in the longitudinal direction thereof.

The film unit 51 is sometimes stored as a single unit as a spare part for replacement in case of product failure.

The pressure stay 56 and the heater holder 55 engage each other at the longitudinal ends of the film unit 51 to prevent the pressure stay 56 and heater holder 55 from separating when the film unit 51 is in a single unit state, in other words, when the film unit 51 is removed from the fixing apparatus 50. The pressure stay 56 and the heater holder 55 are not fixed to each other near the center of the film unit 51 in the longitudinal direction.

When the film unit 51 is in the single unit state, the pressure roller 52 does not oppose the heater of the film unit 51. In this case, the pressure stay 56 and the heater holder 55 may be separated from each other near the longitudinal center of the film unit 51 where the pressure stay 56 and the heater holder 55 are not fixed to each other. In other words, as indicated by the dotted line in FIG. 9C, the longitudinal-center portion of the heater holder 55 may bulge out in the facing direction of the heater 54 relative to the longitudinal-end portions of the heater holder 55.

In this case, the fixing film 53 fitted around the heater holder 55 follows the deformation of the heater holder 55 and also bulges out in the facing direction of the heater 54.

SUMMARY

Accordingly, the present disclosure provides a fixing apparatus that can suppress the deformation of a fixing film.

According to an aspect of the present disclosure, a fixing apparatus includes a film that is tubular and configured to come into contact with a recording medium and rotate, a guide member disposed in an inside space of the film, elongated in a generatrix direction of the film, and configured to guide rotation of the film, a stay member disposed parallel to the generatrix direction of the film in the inside space of the film, a roller disposed so as to be in contact with the outside surface of the film, and a restriction structure disposed at a position between opposite ends of the film in the generatrix direction, wherein the stay member is configured to reinforce the guide member, the film and a roller forms a fixing nip portion between the film and the roller, and the recording medium, having a toner image formed on the recording medium, is heated to fix the toner image onto the recording medium at the fixing nip portion while the sheet passes through the fixing nip portion, and wherein the restriction structure is configured to restrict movement of the guide member in a direction orthogonal to the generatrix direction of the film and also in a direction in which the stay member and the guide member are separated from each other.

Further features of the present disclosure will become apparent from the following description of exemplary embodiments with reference to the attached drawings.

DESCRIPTION OF THE EMBODIMENTS

Embodiments of the present disclosure will be described with reference to the drawings. Dimensions, materials, shapes, and positional relationships of components in the embodiments are to be modified appropriately in accordance with a device to which the present disclosure is applied and in accordance with conditions in which the present disclosure is implemented. In this regard, the embodiments are not intended to limit the present disclosure.

Example 1

1) Outline of Image Forming Process

Figure 1:
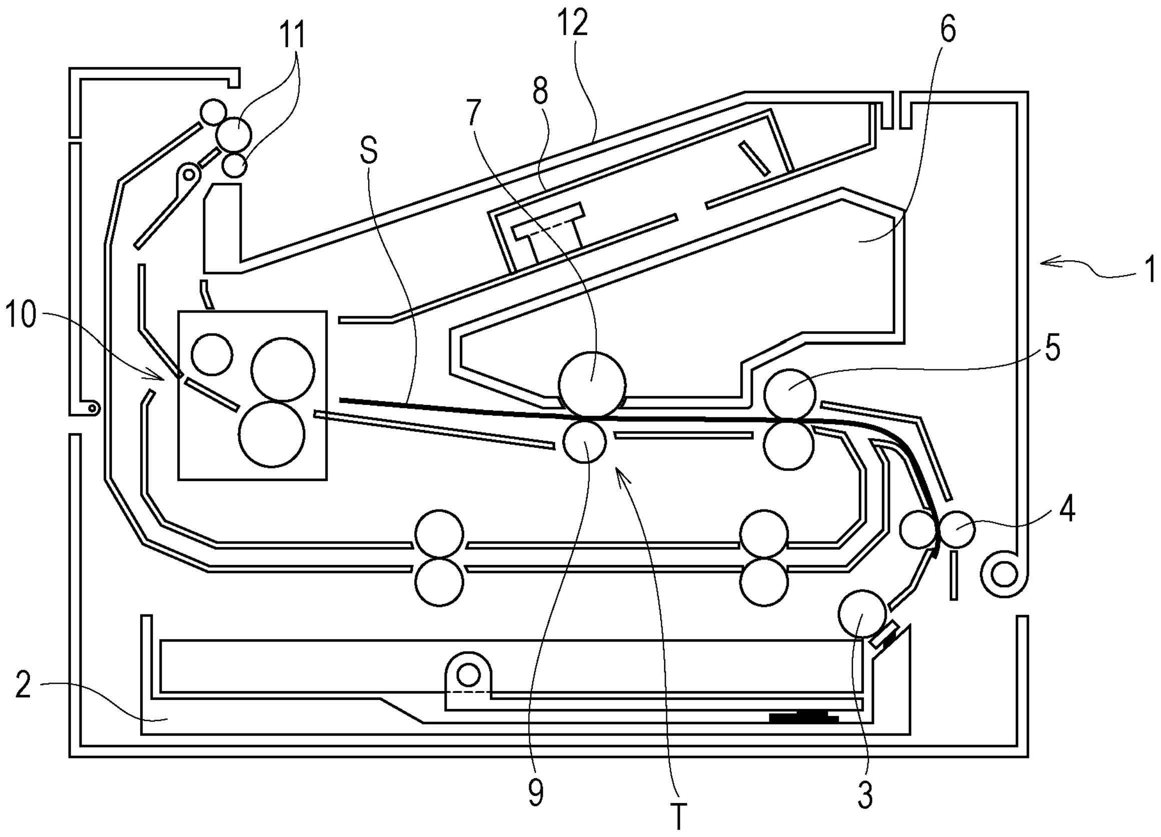
FIG. 1 is a cross-sectional view illustrating an image forming apparatus according to the present disclosure.

Referring to FIG. 1, the image forming process of an electrophotographic image forming apparatus, to which an example of the present disclosure is applied, will be first outlined, from feeding a sheet and forming an image on the sheet to discharging the sheet. FIG. 1 is a schematic cross-sectional view illustrating an image forming apparatus according to Example 1 of the present disclosure.

Sheets S, or recording media S, are stored in a sheet supplying cassette 2, which is detachably attached to the main body 1 of the image forming apparatus (hereinafter referred to as an "apparatus main body 1"). The sheets S are picked up one by one by a feed roller 3 and conveyed to a transfer section T by conveyance roller pairs 4 and 5.

Meanwhile, a latent image is formed on the surface of a drum 7 using laser light emitted from a laser scanner 8. The drum 7 is an image carrying member disposed in a processing cartridge 6 (hereinafter referred to as a "cartridge 6"), which is detachably installed in the apparatus main body 1. The latent image is subsequently developed by a developing device disposed in the cartridge 6 to form a toner image on the drum 7.

The toner image is transferred from the drum 7 to a sheet S using a transfer roller 9 in the transfer section T, and the sheet S is subsequently conveyed to a fixing apparatus 10.

In the fixing apparatus 10, the sheet S is heated and pressed to fix the toner image onto the sheet S. The sheet S is subsequently discharged into a discharge section 12 by a discharge roller pair 11.

2) Structure of Fixing Apparatus

Figure 2:
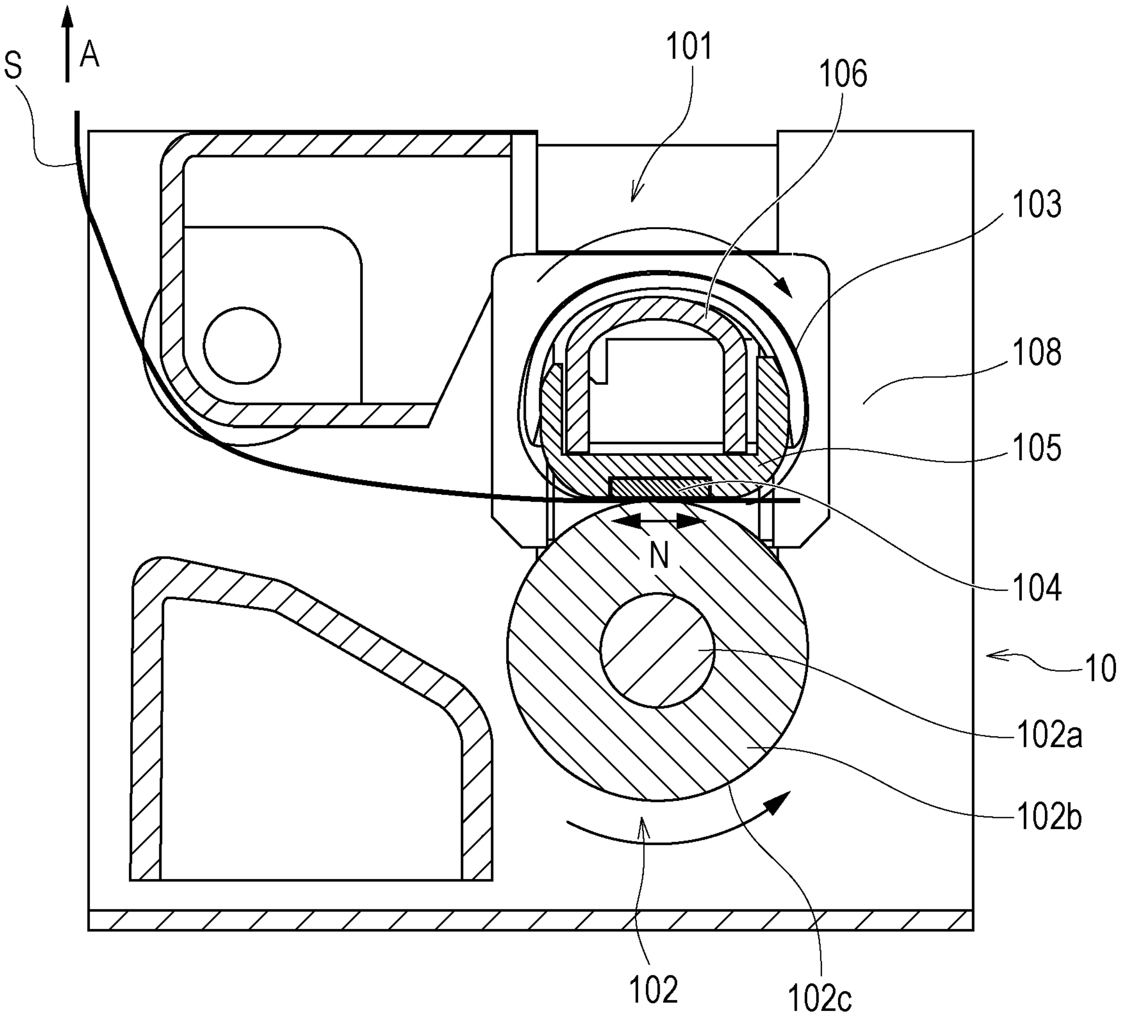
FIG. 2 is a cross-sectional view illustrating a fixing apparatus according to the present disclosure.
Figure 3A:
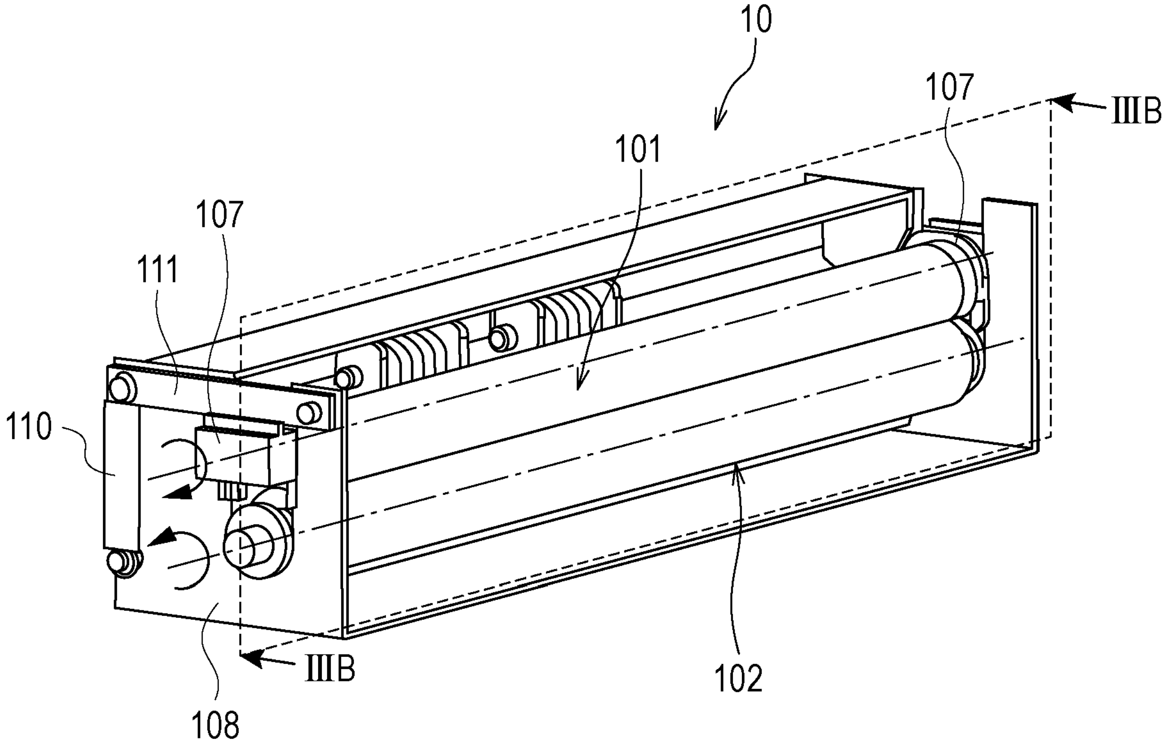
FIG. 3A is a perspective view of the fixing apparatus of the present disclosure.
Figure 3B:
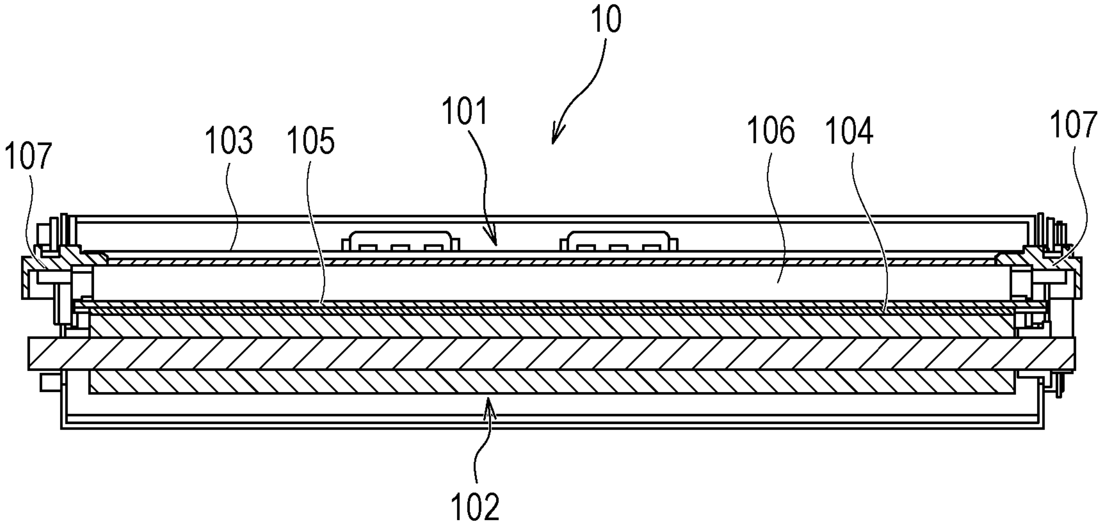
FIG. 3B is a cross-sectional view of the fixing apparatus.

Next, a structure of the fixing apparatus 10 will be described with reference to FIGS. 2, 3A, and 3B. FIG. 2 is a cross-sectional view of the fixing apparatus 10. In FIG. 2, arrow A indicates the direction in which the sheet S is conveyed (i.e., sheet conveyance direction). In the fixing section, the conveyance direction of the sheet S orthogonally intersects the generatrix direction of a film 103. FIG. 3A is a perspective view of the fixing apparatus, and FIG. 3B is a cross-sectional view of the fixing apparatus as viewed from the upstream side thereof in the sheet conveyance direction.

The fixing apparatus 10 includes a film unit 101, a pressure roller 102, and a frame 108. The pressure roller 102 is in contact with the outside surface of the film unit 101, and the pressure roller 102 and the film unit 101 form a fixing nip portion N. The film unit 101 includes a tubular and flexible film 103 and a heater 104 that is in contact with the inside surface of the film 103 and is configured to heat the film 103. The film unit 101 also includes a heater holder 105, a stay member 106, flanges 107, and other members. The heater holder 105 is disposed in the inside space defined by the film 103 to hold the heater 104. The stay member 106 is provided to maintain the rigidity of the film unit 101. The flanges 107 support opposite end portions of the film 103. The stay member 106 is elongated parallel to the heater holder 105 in the longitudinal direction thereof.

The pressure roller 102 includes a metal core 102*a*, an elastic material layer 102*b*, and an outermost releasing layer 102*c*. The elastic material layer 102*b* is made of, for example, silicone rubber. The pressure roller 102 and the film unit 101 form the fixing nip portion N with the film 103 interposed therebetween. The pressure roller 102 and the film unit 101 pinch and convey the sheet S. The pressure roller 102 is rotated using a motor (not illustrated) and gears.

When the pressure roller 102 is rotated, the film 103 is also rotated around by following the rotation of the pressure roller 102.

The shaft of the pressure roller 102 is supported by bearings at both ends. As illustrated in FIG. 3A, U-shaped recesses for supporting the bearings for the pressure roller 102 are formed in the frame 108 of the fixing apparatus 10. In addition, both end portions of the film unit 101 are also supported by the frame 108 using the flanges 107. As is each end of the pressure roller 102, grooves of each flange 107 are fitted in the corresponding U-shaped recess of the frame 108. The film unit 101 is thereby held by the frame 108.

A pressure mechanism that includes a pressure spring 110 and a pressure plate 111 applies pressure on the upper surface of each flange 107. The pressure by the pressure spring 110, which acts via the flanges 107, the stay member 106, and the heater holder 105, urges the heater 104 toward the pressure roller 102. The elastic material layer 102*b* of the pressure roller 102 is thereby compressed, causing the film unit 101 and the pressure roller 102 to form the fixing nip portion N with the film 103 interposed therebetween. The sheet S carrying the toner image thereon is pinched and conveyed while the sheet S is in contact with the film 103 at the fixing nip portion N. Meanwhile, the toner image is heated by the heater 104 through the film 103 and thereby fixed onto the sheet S.

As illustrated in FIG. 3B, the heater 104 and the heater holder 105 are elongated in the longitudinal direction of the fixing apparatus 10 and also in the generatrix direction of the film 103. The heater 104 is a ceramic heater having a ceramic substrate and a heat generation resistor printed on the substrate. Electric power is supplied to the heater 104 using connectors for power supply (not illustrated). The temperature of the heater 104 is monitored by a temperature detector (not illustrated), and the power supplied to the heater 104 is controlled such that the temperature detected by the temperature detector stays at a target temperature.

The heater holder 105 is made by molding a heat-resistant resin, such as liquid crystal polymer (LCP) and polyphenylene sulfide (PPS). The heater holder 105 has a groove in which the heater 104 is fitted and held over the entire longitudinal length thereof. The heater holder 105 also serves as a guide member that guides rotation of the film 103. For this purpose, the heater holder 105 includes multiple ribs each having a curved surface that follows the inside surface of the film 103. The stay member 106 has a U-shaped section and is made of a metal. The stay member 106 is in contact with the heater holder 105 over the entire longitudinal length thereof and thereby reinforces the heater holder 105.

3) Film Unit

A structure of the film unit 101 will be described in detail with reference to FIGS. 4A, 4B, 4C, and 4D.

Figures 4A, 4B, 4C, 4D:
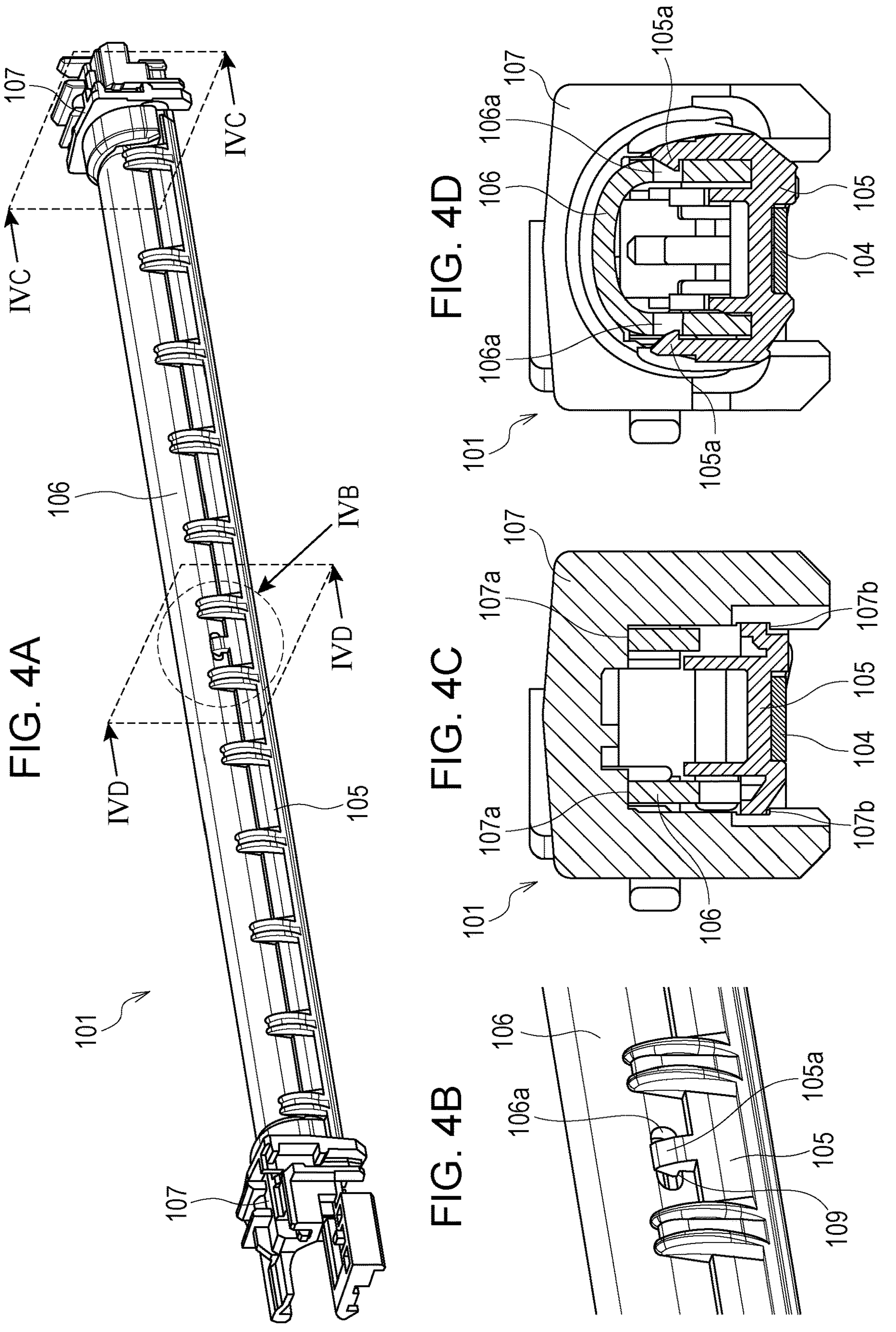
FIGS. 4A and 4B are perspective views illustrating a film unit according to Example 1.
FIGS. 4C and 4D are cross-sectional views illustrating the film unit.

FIG. 4A is a perspective view illustrating the film unit 101 from which the film 103 is removed, and FIG. 4B is an enlarged view of a longitudinal-center portion of the film unit 101. FIG. 4C is a cross section taken along section IVC-IVC in FIG. 4A, and FIG. 4D is a cross section taken along section IVD-IVD in FIG. 4A.

The flanges 107 are disposed at respective longitudinal ends of the film unit 101. As illustrated in FIG. 4C, each flange 107 has surfaces 107*a* for pressing the stay member 106 and hook portions 107*b* to be engaged with the heater holder 105. The heater holder 105 and the stay member 106 are in contact and engaged with each other using the flanges 107 disposed at both ends thereof. The heater holder 105 and the stay member 106 are engaged with each other in the pressure application direction of the flanges 107.

As illustrated in FIGS. 4B and 4D, the heater holder 105 has hook portions 105*a* at positions near the center of the film 103 in the generatrix direction thereof. Holes 106*a* are formed in the stay member 106, and the respective hook portions 105*a* engage the holes 106*a* to connect the heater holder 105 and the stay member 106 together. This mechanism serves as a restriction structure 109 that restricts movement of the stay member 106 with respect to the heater holder 105. The restriction structure 109 restricts the movement of the guide member in the direction orthogonal to the generatrix direction of the film 103 and in the direction in which the stay member 106 and the heater holder 105 are separated away from each other. The restriction structure 109 may be disposed at an any arbitrary position between opposite ends of the film 103 in the generatrix direction.

According to the structure described above, the heater holder 105 and the stay member 106 engage each other at opposite ends and also at a position near the center (i.e., substantially at the center) in the longitudinal direction when the film unit 101 is in a single unit state, in other words, when the heater 104 does not oppose the pressure roller. This can reduce the likelihood that the heater holder 105 warps locally in the vicinity of the longitudinal center thereof with respect to the stay member 106, which can reduce similar warping of the film 103 fitted around the heater holder 105.

The film unit 101 is normally equipped with a safety device 112 as a safety measure to prevent the heater 104 from overheating. The safety device 112 can sense a high temperature not permissible for the heater 104 and can physically cut the electricity supply to the heater 104.

Figure 5:
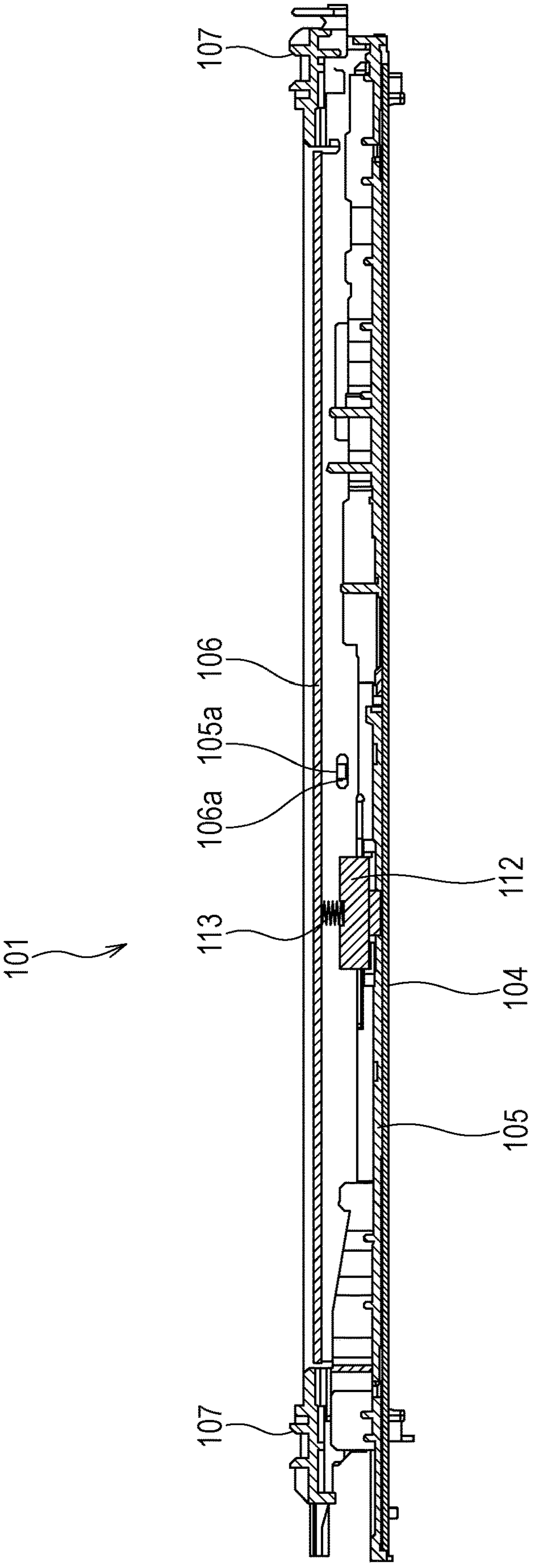
FIG. 5 is a cross-sectional view illustrating the position of an urging member inside the film unit of Example 1.

As illustrated in FIG. 5, an urging member 113 is disposed between the safety device 112 and the stay member 106 so that the safety device 112 can detect the temperature of the heater 104 reliably. The spring pressure of the urging member 113, however, exerts a force in the direction in which the heater holder 105 and the stay member 106 are separated from each other.

Even in the case of such a force acting in the heater holder 105, the engagement of the hook portions 105*a* of the heater holder 105 and the holes 106*a* formed in the stay member 106 can reduce the deformation of the heater holder 105.

Note that although the heater holder 105 and the stay member 106 engage each other using the flanges 107 at the longitudinal ends in the present example, the heater holder 105 and the stay member 106 may engage each other directly using the structure similar to that near the longitudinal center.

In addition, near the longitudinal center, the heater holder 105 and the stay member 106 engage each other at both upstream and downstream positions in the conveyance direction of the sheet S. The heater holder 105 and the stay member 106, however, may engage each other either at the upstream position or at the downstream position.

Example 2

Figure 6A:
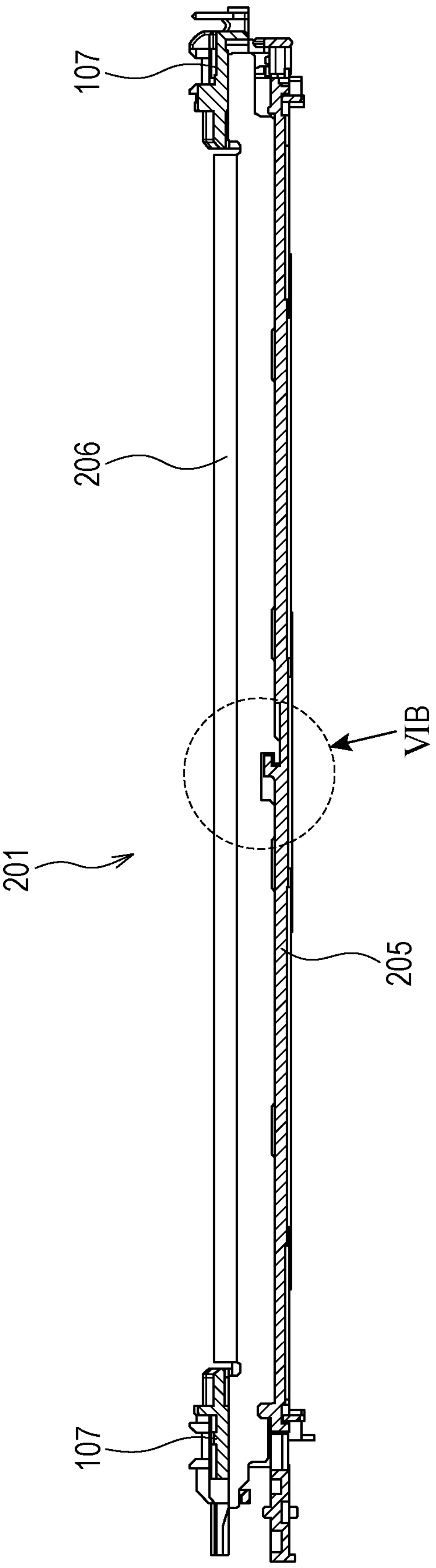
FIGS. 6A and 6B are cross-sectional views illustrating a film unit according to Example 2 as viewed from the upstream side in the sheet conveyance direction.
Figure 6B:
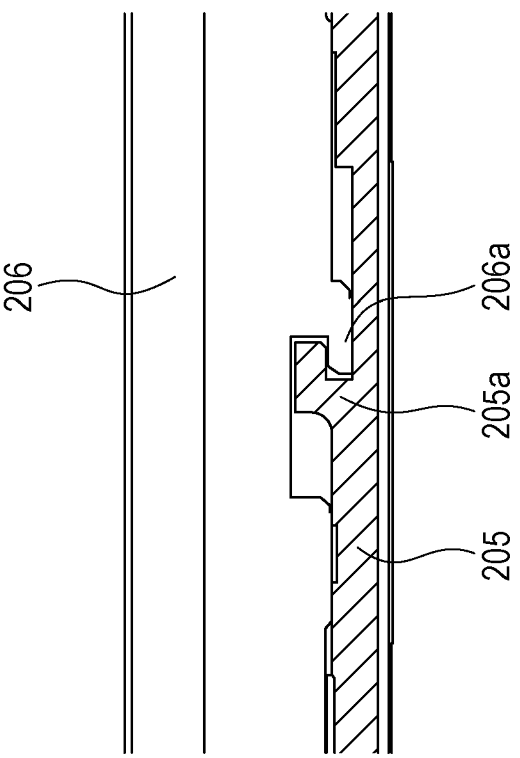

Next, Example 2 of the present disclosure will be described with reference to FIGS. 6A and 6B. Note that the description of the same elements described in Example 1 will be omitted. FIG. 6A is a cross-sectional view illustrating a film unit 201 according to Example 2 as viewed from the upstream side thereof in the sheet conveyance direction. FIG. 6B is an enlarged view of the vicinity of the longitudinal center of the film unit 201. Note that the film 103 is not illustrated for the sake of better understanding.

Note that elements having the structures and effects substantially same as, or similar to, those described in Example 1 will be denoted by the same reference signs, and the detailed descriptions will be omitted.

In the present example, a stay member 206 has hook-like protruded portions 206*a* in the vicinity of the longitudinal center (i.e., substantially at the center) of the film unit 201, whereas a heater holder 205 has depressed portions 205*a* at positions corresponding to the protruded portions 206*a*.

The engagement between the protruded portions 206*a* and the depressed portions 205*a* reduces the likelihood that the heater holder 205 warps locally in the vicinity of the longitudinal center thereof with respect to the stay member 206, as is the case of Example 1.

Note that the heater holder 205 and the stay member 206 may engage each other in the vicinity of the longitudinal center at both upstream and downstream positions in the conveyance direction of the sheet S. Alternatively, the heater holder 205 and the stay member 206 may engage each other either at the upstream position or at the downstream position.

Example 3

Figure 7A:
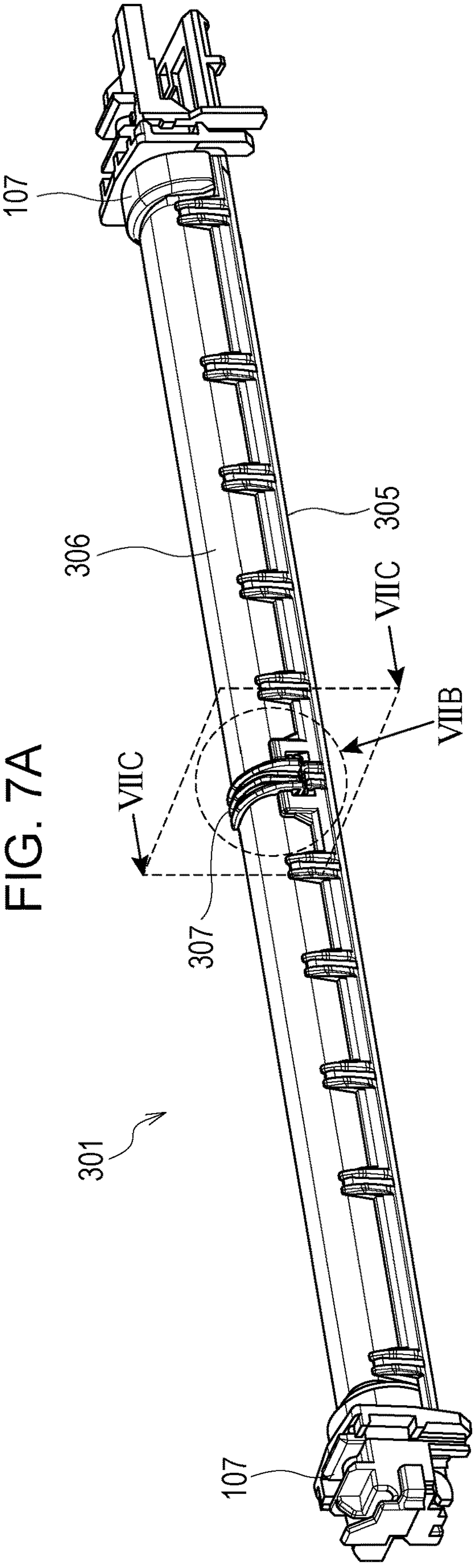
FIGS. 7A and 7B are perspective views illustrating a film unit according to Example 3.
Figure 7C:
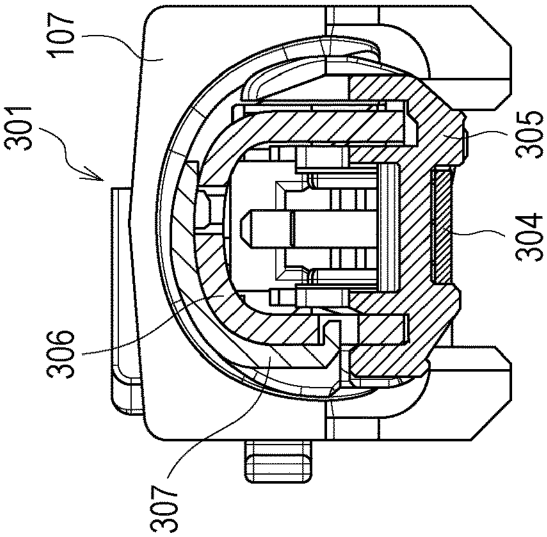
FIG. 7C is a cross-sectional view of the film unit.
Figure 7B:
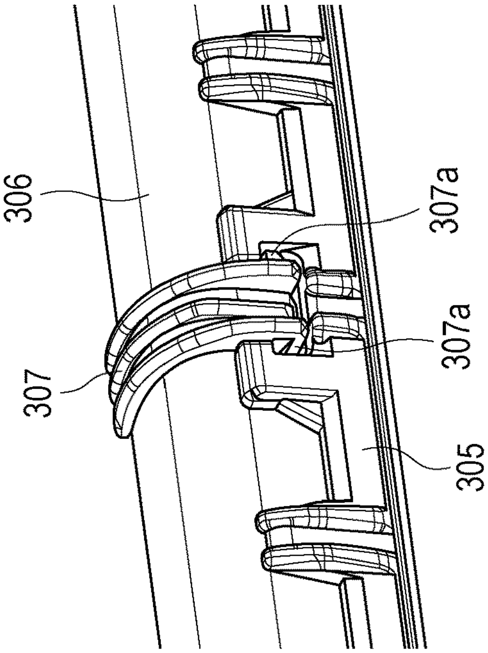

Next, Example 3 of the present disclosure will be described with reference to FIGS. 7A to 7C. The description of the same elements described in Examples 1 and 2 will be omitted. FIG. 7A is a perspective view illustrating a film unit 301 according to Example 3, and FIG. 7B is an enlarged view of the vicinity of the longitudinal center of the film unit 301. FIG. 7C is a cross section taken along section VIIC-VIIC in FIG. 7A. Note that the film 103 is not illustrated for the sake of better understanding.

Note that elements having the structures and effects substantially same as, or similar to, those described in Examples 1 and 2 will be denoted by the same reference signs, and the detailed descriptions will be omitted.

An engagement member 307 is disposed in a film unit 301 at a position between longitudinal ends of a stay member 306.

In the present example, the engagement member 307 causes the stay member 306 and a heater holder 305 to engage each other in the vicinity of the longitudinal center (i.e., substantially at the center).

The engagement member 307 has hooks 307*a* at respective opposite ends thereof. The hooks 307*a* engage the heater holder 305 and thereby connect the heater holder 305 indirectly to the stay member 306.

This can reduce the likelihood that the heater holder 305 warps locally in the vicinity of the longitudinal center thereof with respect to the stay member 306, which can reduce similar warping of the film 103 fitted around the heater holder 305, as are the cases for Examples 1 and 2.

The engagement member 307 is shaped so as to follow the inside surface of the film 103 so that the engagement member 307 can support the film 103 from inside and can reduce deformation of the film 103 when the film 103 rotates.

In addition, when the film unit 301 is in the single unit state, the inside surface of the film 103 comes into contact with the engagement member 307, which can reduce local deformation of the film 103.

In the present example, the engagement member 307 is disposed so as to face downstream in the conveyance direction of the sheet S. Accordingly, the engagement member 307 engages the heater holder 305 only at a downstream position. The engagement member 307, however, may engage the heater holder 305 only at an upstream position or both at a downstream position and at an upstream position.

In the present example, only one engagement member is provided. However, multiple engagement members may be disposed in the longitudinal direction.

Example 4

Figure 8:
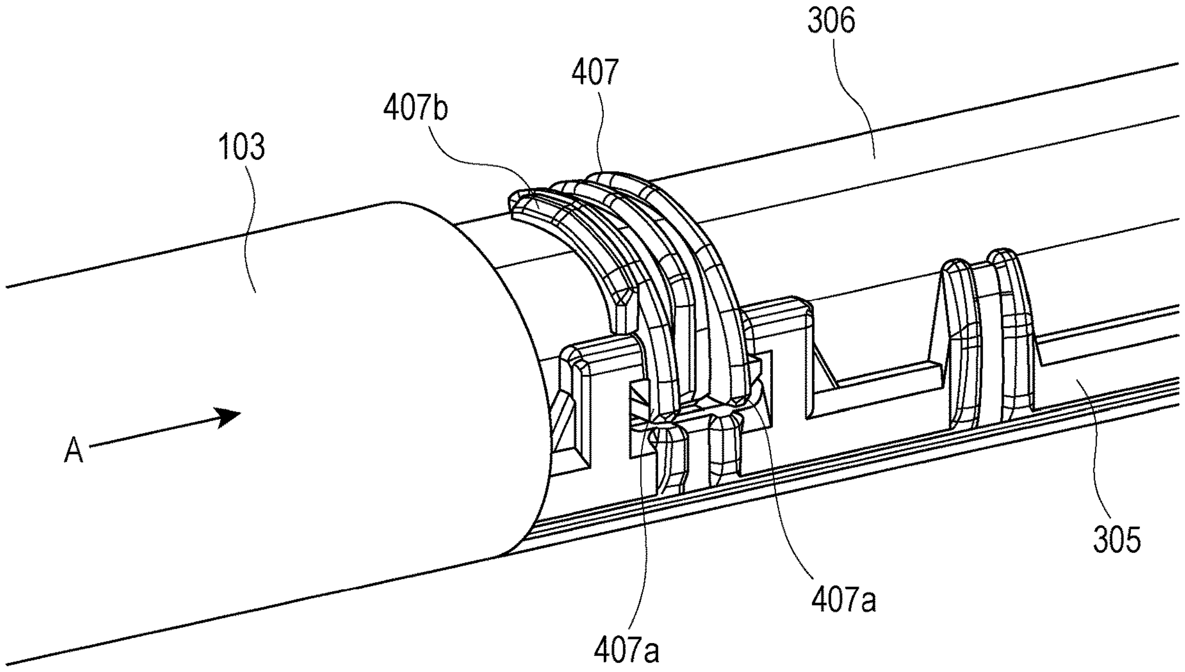
FIG. 8 is a perspective view illustrating a film unit according to Example 4.
Figure 9A:
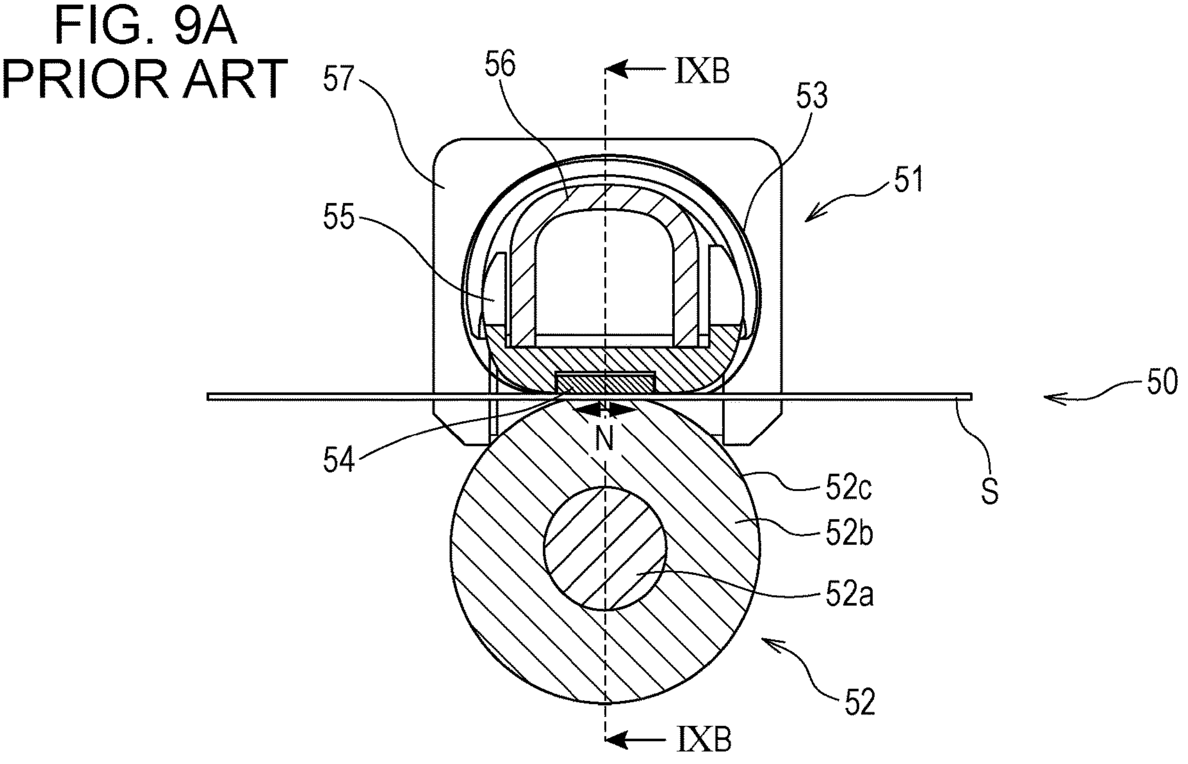
FIG. 9A PRIOR ART
FIGS. 9A, 9B, and 9C are views illustrating structure of a conventional fixing apparatus.
Figure 9B:
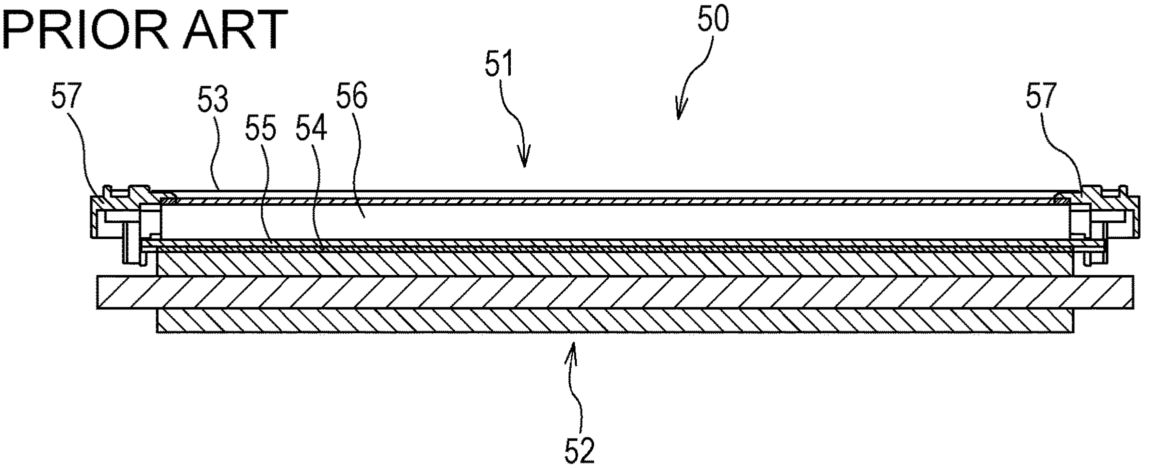
FIG. 9B PRIOR ART
Figure 9C:
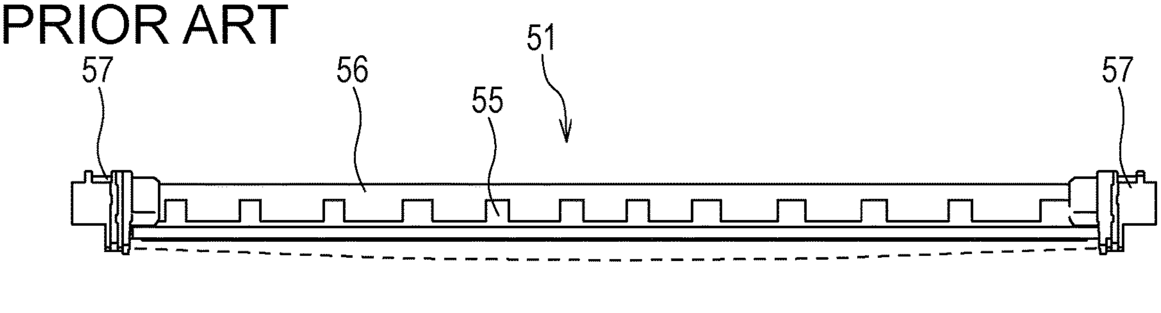
FIG. 9C PRIOR ART

Next, Example 4 of the present disclosure will be described with reference to FIG. 8. The description of the same elements described in Examples 1 to 3 will be omitted. FIG. 8 is an enlarged perspective view illustrating the vicinity of the longitudinal center of a film unit 401 according to Example 4. The film 103 illustrated in FIG. 8 is in a state of assembly, which is provided for the sake of better understanding.

Note that elements having the structures and effects substantially same as, or similar to, those described in Examples 1 to 3 will be denoted by the same reference signs, and the detailed descriptions will be omitted.

In the present example, an engagement member 407 is formed integrally with the stay member 306. The engagement member 407 has a guide portion 407*b* that faces the film 103 when the film 103 is inserted in the direction of arrow A during assembly. For example, the guide portion 407*b* has a smoothly curved shape or a chamfer shape.

The guide portion 407*b* reduces the likelihood of an end of the film 103 being caught by the engagement member 407 when the film 103 is disposed over the heater holder 305 and the stay member 306 during assembly. This can reduce the occurrence of damage at the end of the film 103 during assembly.

Example 5

In the present example, the engagement member 307 described in Example 4 also serves as a film-deformation regulating member.

Figure 10A:
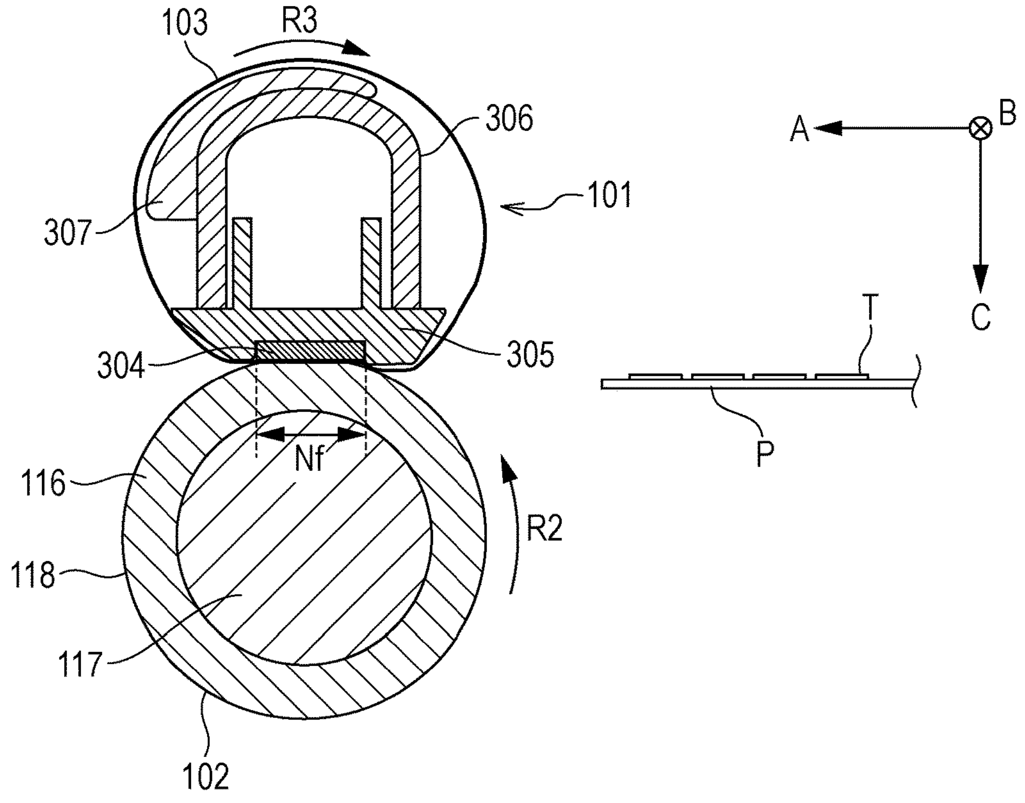
FIGS. 10A and 10B are schematic cross-sectional views illustrating a structure of the fixing apparatus according to Example 5.
Figure 10B:
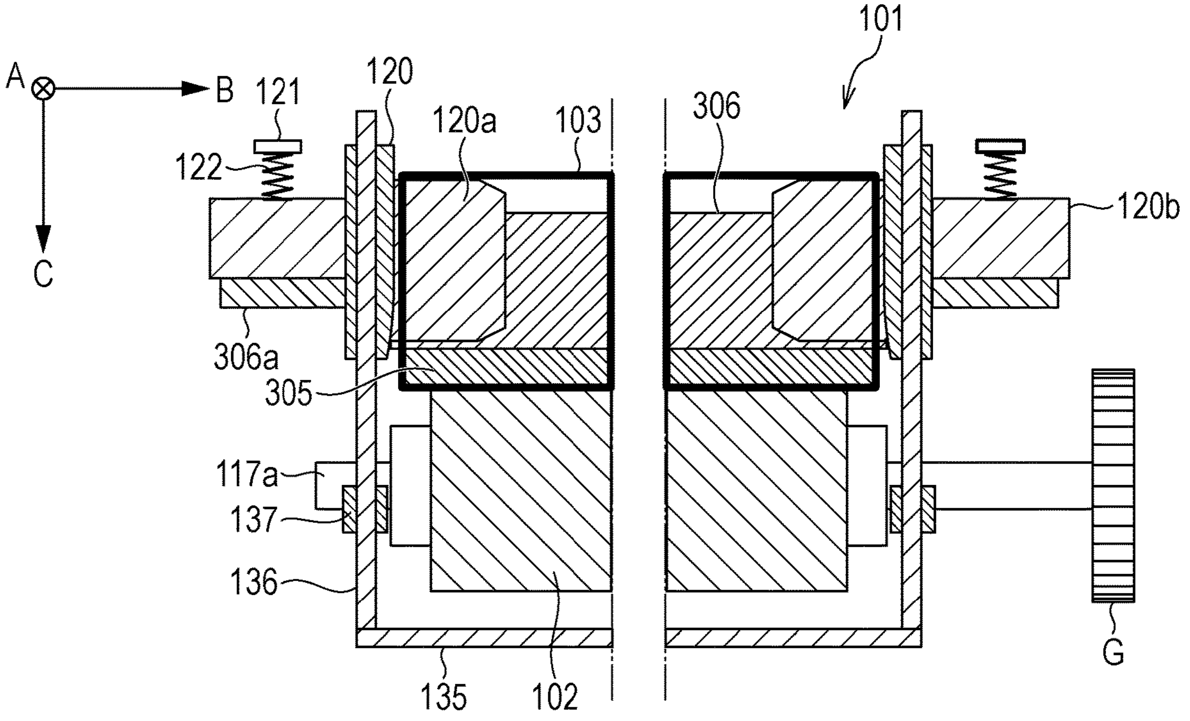

Fixing Apparatus fixing apparatus 10 of the present example is outlined below. The fixing apparatus 10 of the present example is an apparatus that employs a film heating method and is developed to reduce start-up time and power consumption. FIG. 10A is a cross-sectional view illustrating the vicinity of the longitudinal center of the fixing apparatus 10 of the present example, and FIG. 10B is a cross-sectional view illustrating longitudinal-end portions of the fixing apparatus 10. In the following description, reference A denotes the conveyance direction of recording medium, reference B denotes the longitudinal direction of heater holder, and reference C denotes the vertical direction orthogonal to the slide surface of heater.

As illustrated in FIG. 10B, right and left flanges 120 are fitted on outward-extending right and left arms 306*a* of the stay member 306. The film unit 101 is installed between right and left side plates 136 of an apparatus frame 135 in such a manner that the film unit 101 is disposed above the pressure roller 102 and substantially parallel to the pressure roller 102 with a heater 304 facing downward. A metal core shaft 117*a* of the pressure roller 102 is supported by bearing members 137 fitted in respective right and left side plates 136 of the apparatus frame 135. The right and left flanges 120 each have vertical grooves, and the vertical grooves engage vertical edges of a vertical guide slit formed in each of the right and left side plates 136. In the present example, the flanges 120 are made of liquid crystal polymer.

Pressure springs 122 are loaded between respective pressure application portions 120*b* and corresponding pressure spring supporting portions 121 of the right and left flanges 120. Accordingly, the pressure springs 122 press the heater 304 via the right and left flanges 120, the stay member 306, and the heater holder 305. The heater 304 is pressed against the upper surface of the pressure roller 102 with the film 103 interposed therebetween with a predetermined pressing force. In the present example, the pressure applied by the pressure springs 122 is set such that the total pressing force applied to the film 103 against the pressure roller 102 becomes 15 kilogram-force (kgf). At a fixing nip portion Nf, the film 103 is nipped between the heater 304 and the pressure roller 102. The film 103 is thereby bent so as to follow the flat bottom surface of the heater 304, and the inside surface of the film 103 comes into close contact with the flat bottom surface of the heater 304. A fixing-film restriction structure 120*a* of each flange 120 is shaped so as to follow the natural shape of the film 103 formed when the film 103 is pressed at the fixing nip portion Nf. The shape of the fixing-film restriction structure 120*a*, however, is shifted in position by 0.5 mm upstream in the conveyance direction from the natural shape of the film 103. Accordingly, the inside surface of the film 103 is restricted at an upstream position at opposite ends of the film 103. The rotation path of the film 103 is thereby stabilized when the film 103 is rotated.

The pressure roller 102 is rotated in the direction of arrow R2 in FIG. 10A at a predetermined speed by a drive mechanism (not illustrated) that transmits rotational power to a drive gear G of the pressure roller 102. In conjunction with the rotation of the pressure roller 102, a rotational force is applied to the film 103 due to friction between the pressure roller 102 and the film 103 at the fixing nip portion Nf. The film 103 is passively rotated in the direction of arrow R3 in FIG. 10A around the heater holder 305 due to the rotation of the pressure roller 102 while the inside surface of the film 103 is in close contact with, and is sliding on, the bottom surface of the heater 304. The pressure roller 102 is set to rotate at a surface moving speed of 200 mm per second. Note that a lubricant having heat resistant properties is applied on the inside surface of the film 103, which facilitates sliding of the inside surface of the film 103 on the heater 304 and the heater holder 305. In the present example, a fluorine-based grease is used as the lubricant. More specifically, the grease is made of perfluoropolyether (PFPE) used as a base oil and polytetrafluoroethylene (PTFE) powder used as a thickening agent.

Heater Holder

Figure 11:
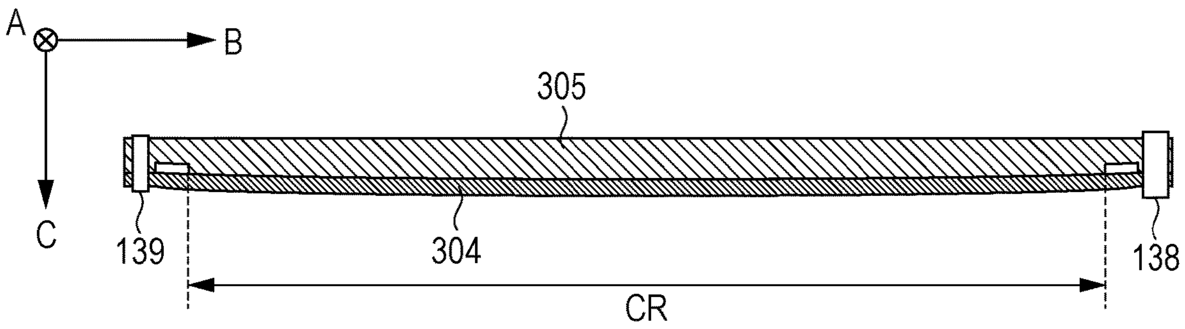
FIG. 11 is a schematic view for explaining the profile of a heater holder of Example 5.

The shape of the heater holder 305 is described in detail below. As illustrated in the diagrams of FIGS. 11, the heater holder 305 has a crown shape in which a longitudinal-center portion of a seating surface that supports the heater 304 projects toward the pressure roller 102 relative to the longitudinal ends of the seating surface. Both ends of a heater 304 are attached to the heater holder 305 using a heater power supply member 138 at one end and a heater clip 139 at the other end in such a manner that the heater 304 is seated on the seating surface of the heater holder 305. The crown shape follows a gentle curve of the second order in a region CR of the heater holder 305, the region opposing the pressure roller 102 and having a longitudinal length of 225 mm. The longitudinal center projects toward the pressure roller 102 by 0.4 mm relative to the longitudinal ends. Pressing the heater holder 305 against the pressure roller 102 deforms the stay member 306 and the metal core 117. Because of the crown shape, however, a uniform-width fixing nip Nf can be formed over the longitudinal length. In the present example, the length (i.e., width) of the fixing nip Nf in the conveyance direction of recording medium is 6.2 mm, which is constant over the entire longitudinal length thereof.

Figure 12A:
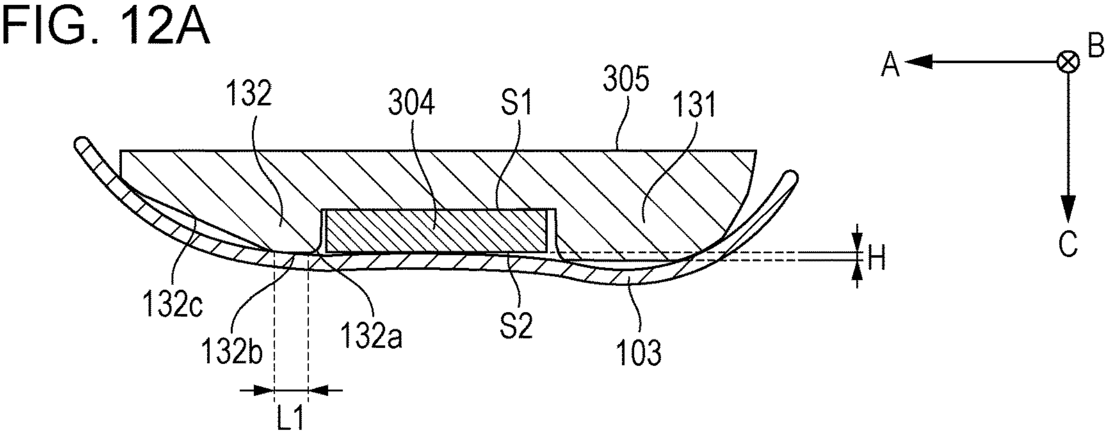
FIGS. 12A, 12B, and 12C are diagrams illustrating the heater holder of Example 5.

FIG. 12A is a cross-sectional view illustrating the heater 304 and the heater holder 305 near the longitudinal center and near the fixing nip Nf. The heater holder 305 has an upstream protrusion 131 at a position upstream of the heater 304 in the conveyance direction of recording medium. The upstream protrusion 131 protrudes toward the pressure roller 102 relative to a seating surface S1 for the heater 304. The protrusion height H of the upstream protrusion 131 from the slide surface S2 of the heater needs to satisfy the conditions that the upstream protrusion 131 can control the rotation path of the film 103 and can prevent the film 103 from touching an edge portion of the heater 304. If the protrusion height H is too great, the upstream protrusion 131 may interfere with a sheet S entering the fixing nip. Accordingly, it is desirable that the protrusion height H be approximately 0.1 to 1.0 mm. In the present example, the height H of the upstream protrusion 131 from the slide surface S2 of the heater is set to be 0.2 mm.

The heater holder 305 has a downstream protrusion 132 at a position downstream of the heater 304 in the conveyance direction of recording medium. The downstream protrusion 132 protrudes toward the pressure roller 102 relative to the seating surface S1 for the heater 304. The heater 304 is disposed in a longitudinal region that recording media P pass, and the position of the heater 304 in the conveyance direction is set by positioning members disposed at longitudinally opposite ends of the heater holder 305. The downstream protrusion 132 is formed so as to have a clearance of 0.05 mm away from the downstream end of the heater 304.

The downstream protrusion 132 has a round portion 132*a* near the heater 304, a flat portion 132*b* continued from the round portion 132*a*, and an inclined portion 132*c* continued from the flat portion 132*b*. The inclined portion 132*c* is inclined in a direction away from the pressure roller 102. In the present example, the round portion 132*a* has a curvature radius of 0.3 mm. It is desirable that the flat portion 132*b* be substantially flush with the slide surface S2 of the heater in height. In the present example, the height of the flat portion 132*b* from the seating surface S1 is 1.0 mm.

Figure 12B:
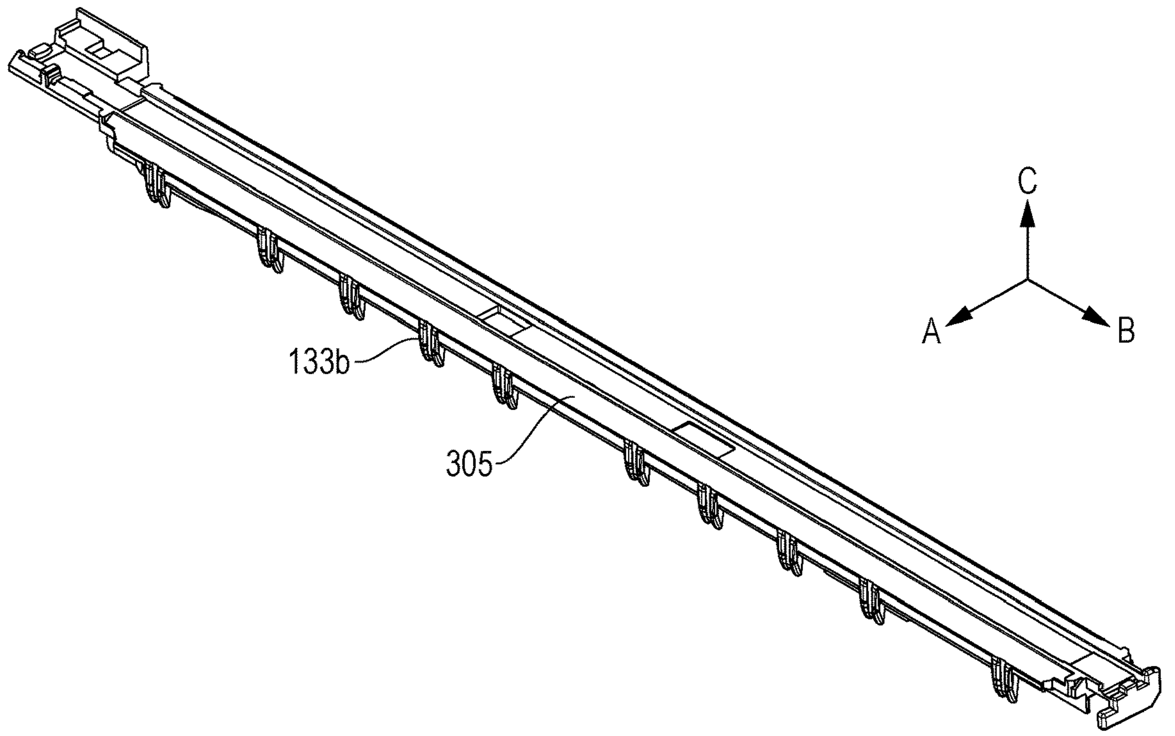
Figure 12C:
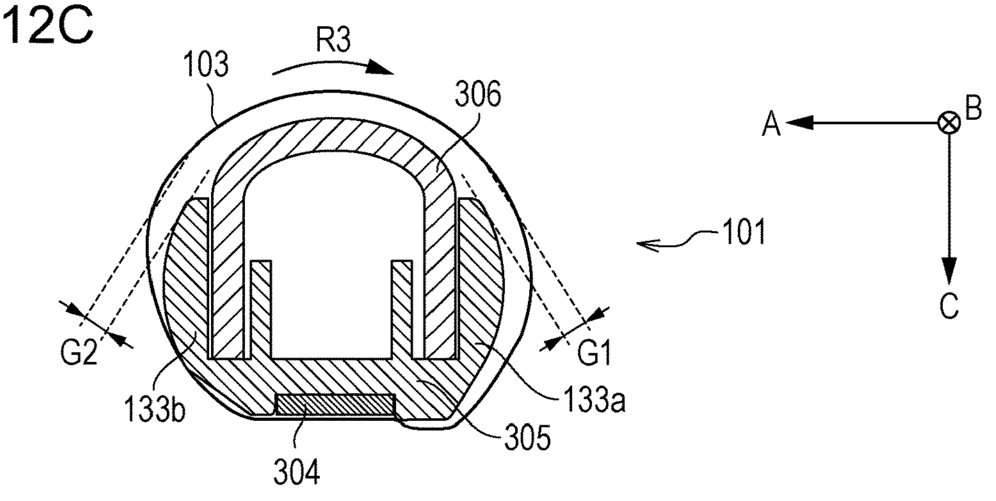

FIG. 12B is a perspective view of the heater holder 305. FIG. 12C is a cross-sectional view of the film unit 101 cut at a longitudinal position so as to include an upstream rib 133*a* and a downstream rib 133*b*. The upstream rib 133*a* and the downstream rib 133*b* are formed on the heater holder 305 at upstream and downstream positions in the conveyance direction, respectively. FIG. 12C illustrates the shape of the film 103 when the film 103 is in steady rotation.

In the present example, ten upstream ribs 133*a* and ten downstream ribs 133*b* are formed on the heater holder 305 in the sheet-passing region. The upstream ribs 133*a* and the downstream ribs 133*b* are disposed at predetermined regular intervals in the longitudinal direction of the heater holder 305. The upstream ribs 133*a* and the downstream ribs 133*b* are shaped so as to provide predetermined clearances from the film 103 when the film 103 is in steady rotation. By doing so, the heat of the film 103 is prevented from escaping due to the film 103 coming into contact with the upstream ribs 133*a* and the downstream ribs 133*b*.

When the film 103 deforms largely due to an external force, the upstream ribs 133*a* and the downstream ribs 133*b* support the film 103 from inside so as to prevent the film 103 from breaking. For example, a large deformation of the film 103 may occur when a user deals with sheet jamming, for example, by pulling by hand and removing a sheet S that is jammed at the fixing nip Nf. In the present example, as illustrated in FIG. 12C, a clearance of 0.8 mm (G1) is provided between the inside surface of the film 103 and the tip of each upstream rib 133*a*, and a clearance of 0.8 mm (G2) is also provided between the inside surface of the film 103 and the tip of each downstream rib 133*b*.

Film-Deformation Regulating Member

Figure 13A:
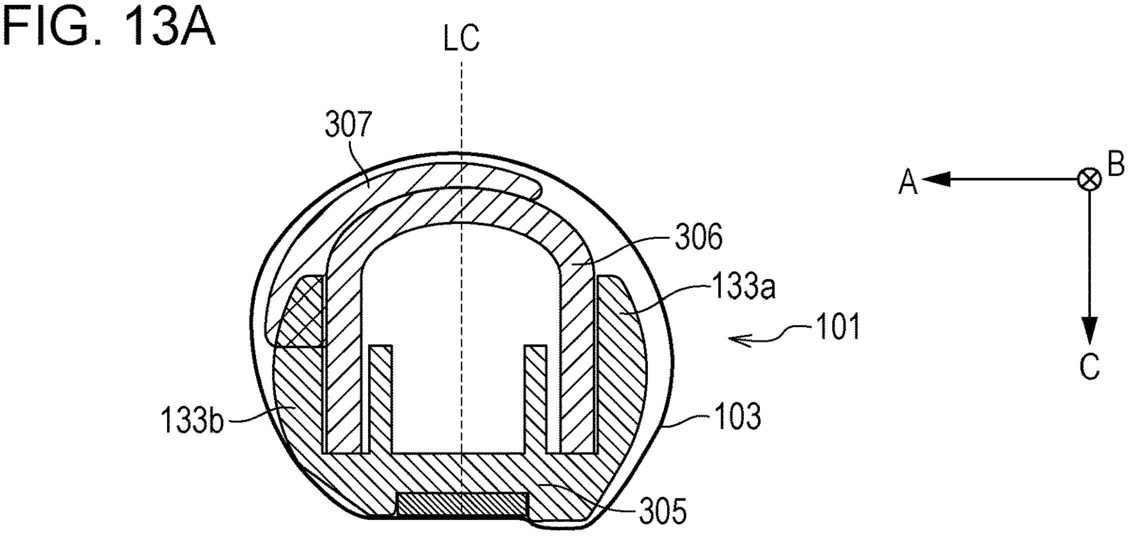
FIGS. 13A, 13B, and 13C are diagrams illustrating a film-deformation regulating member according to Example 5.
Figure 13B:
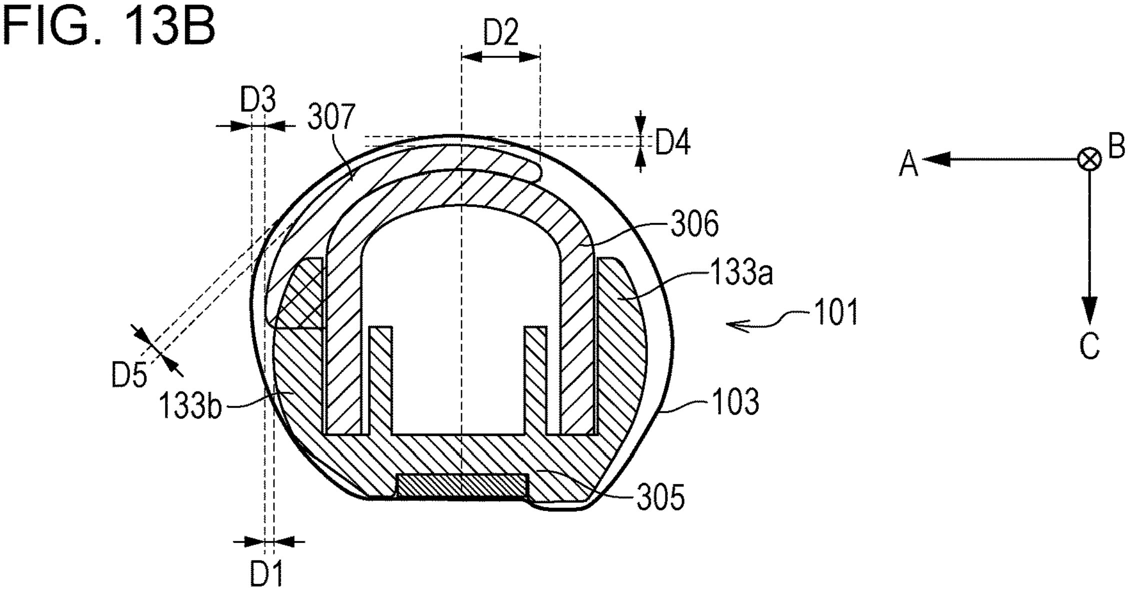
Figure 13C:
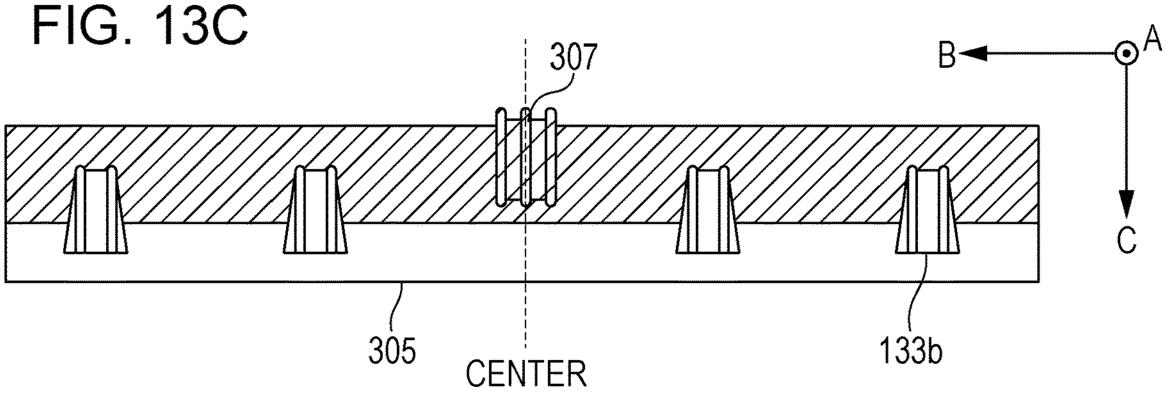

FIG. 13A is a cross-sectional view illustrating a longitudinal-center portion of the film unit 101. FIG. 13B is a view for explaining a positional relationship of the heater holder and the inside surface of the fixing film. FIG. 13C is a view illustrating longitudinal positions of the stay member 306, the heater holder 305, and a film-deformation regulating member (engagement member) 307, which are disposed inside the film unit 101. In the present example, the film-deformation regulating member 307 is attached to the stay member 306. In the present example, a hook (not illustrated) of the film-deformation regulating member 307 is inserted in a through-hole formed in the stay member 306, thereby fixing the film-deformation regulating member 307 to the stay member 306. The fixation, however, can be done by an any appropriate method using, for example, a double-sided tape or an adhesive. The film-deformation regulating member 307 is made of liquid crystal polymer, as is the heater holder 305, for the purpose of satisfying requirements of heat resistance and dimensional accuracy. The film-deformation regulating member 307 is shaped like a rib having three protrusions on the surface in order to minimize the amount of heat escaping when the film-deformation regulating member 307 comes into contact with the film 103.

The film-deformation regulating member 307 partially covers stay member 306 from a downstream portion of the stay member 306 in the conveyance direction to an upper portion thereof. FIG. 13B illustrates the film-deformation regulating member 307 that superposes the downstream ribs 133*b* in the longitudinal direction, which is provided for the purpose of explaining the positional relationship between the heater holder and the inside surface of the fixing film. The shape of the film 103 illustrated in FIG. 13B is the shape that the film 103 assumes when the film 103 is in steady rotation.

The film-deformation regulating member 307 projects downstream from the downstream rib 133*b* by 0.5 mm (D1) in the conveyance direction and is spaced by 0.3 mm (D3) from the film 103 that is in steady rotation. The film-deformation regulating member 307 is disposed such that a portion of the film-deformation regulating member 307 from a downstream position to an upper position is spaced at least by 0.3 mm from the fixing film being in steady rotation.

When an imaginary line LC is drawn so as to pass through the rotation axis of the pressure roller and to extend orthogonal to the surface of the heater that opposes the pressure roller, the imaginary line LC is a substantially central line of the fixing film as the fixing film is viewed in the generatrix direction. As illustrated in FIG. 13A, with respect to the imaginary line LC, an upstream portion of the film-deformation regulating member 307 is shorter than a downstream portion thereof when the lengths in the rotation direction are compared.

It is desirable that at least one film-deformation regulating member 307 be disposed on the stay member 306 within a minimum sheet-passing width region, which is a longitudinal region through which a minimum-size printable sheet can pass. In the present example, as illustrated in FIG. 13C, the film-deformation regulating member 307 is disposed at the longitudinal center of the sheet-passing region and between downstream ribs 133*b* of the heater holder.

Figure 14A:
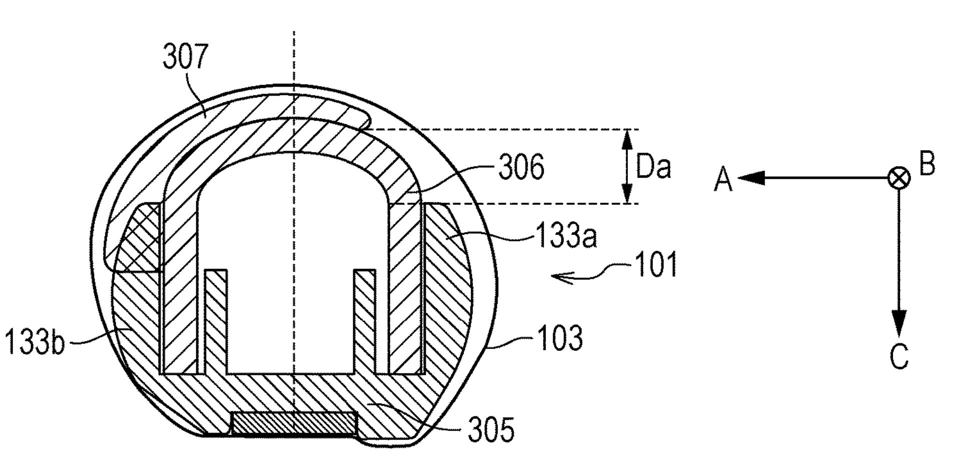
FIGS. 14A, 14B, 14C, and 14D are views illustrating a positional relationship between the film-deformation regulating member and ribs of the heater holder according to Example 5.
Figure 14B:
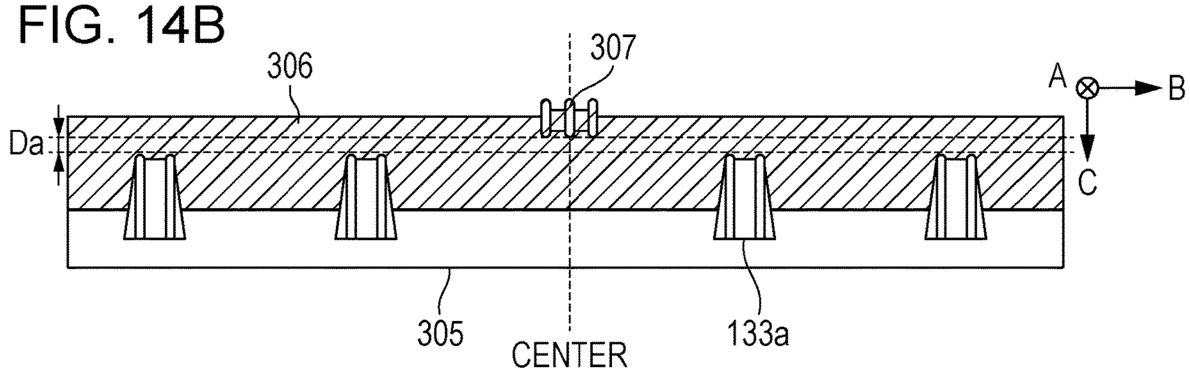
Figure 14C:
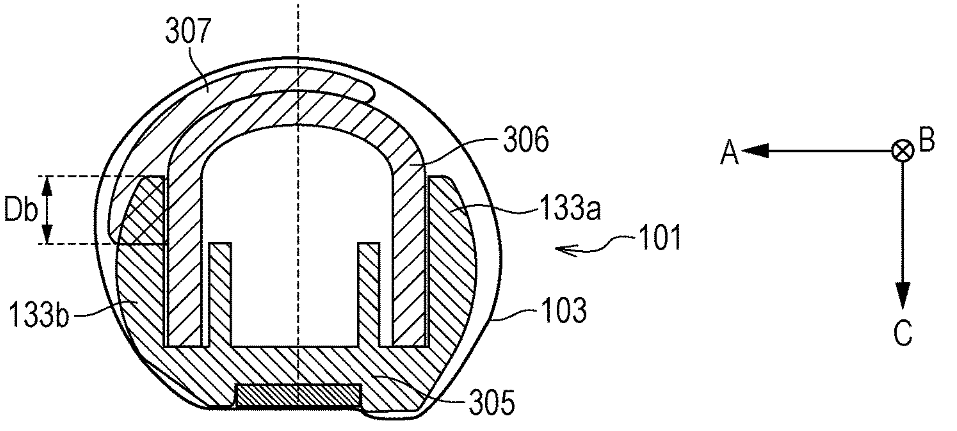
Figure 14D:
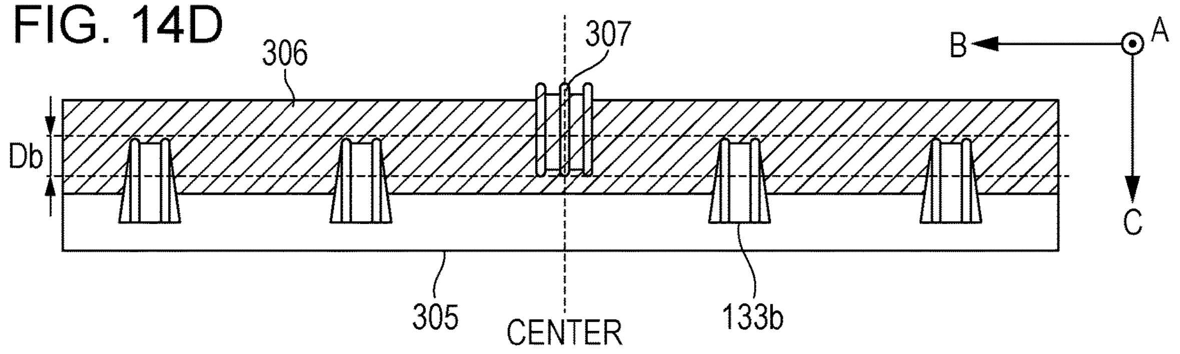

As illustrated in FIGS. 14A and 14B, the film-deformation regulating member 307 is spaced from the upstream ribs 133*a* by a length Da when the film-deformation regulating member 307 is viewed in the generatrix direction of the fixing film as in FIG. 14A or viewed from the upstream side in the recording-medium conveyance direction as in FIG. 14B. As illustrated in FIGS. 14C and 14D, the film-deformation regulating member 307 overlaps the downstream ribs 133*b* by a length Db when the film-deformation regulating member 307 is viewed in the generatrix direction of the fixing film as in FIG. 14C or viewed from the downstream side in the recording-medium conveyance direction as in FIG. 14D.

Figure 15:
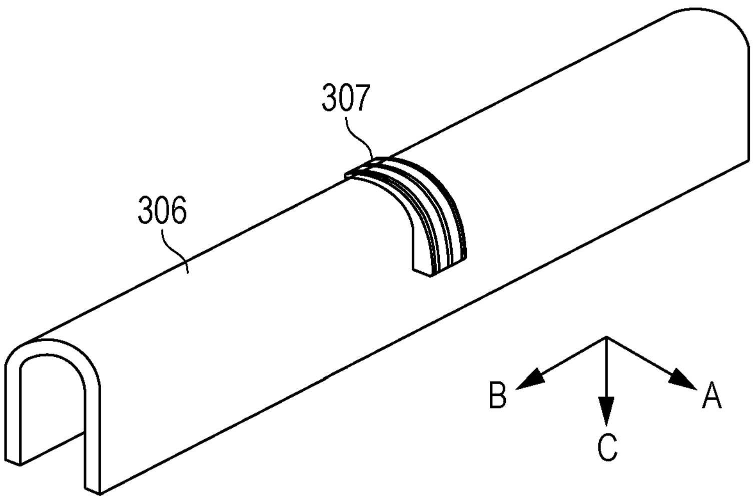
FIG. 15 is a view for explaining fixation of the film-deformation regulating member of Example 5.

FIG. 15 is a perspective view illustrating the film-deformation regulating member 307 attached to the stay member 306. In the present disclosure, the maximum sheet-passing width of the fixing apparatus is 216 mm, and the minimum sheet-passing width is 100 mm.

Advantageous Effects of Present Example

The following describes the behavior of the film 103 when large size sheets, such as LTR- or A4-size recording media, and small size sheets, which are smaller than A4, pass through the fixing apparatus successively.

Figure 16A:
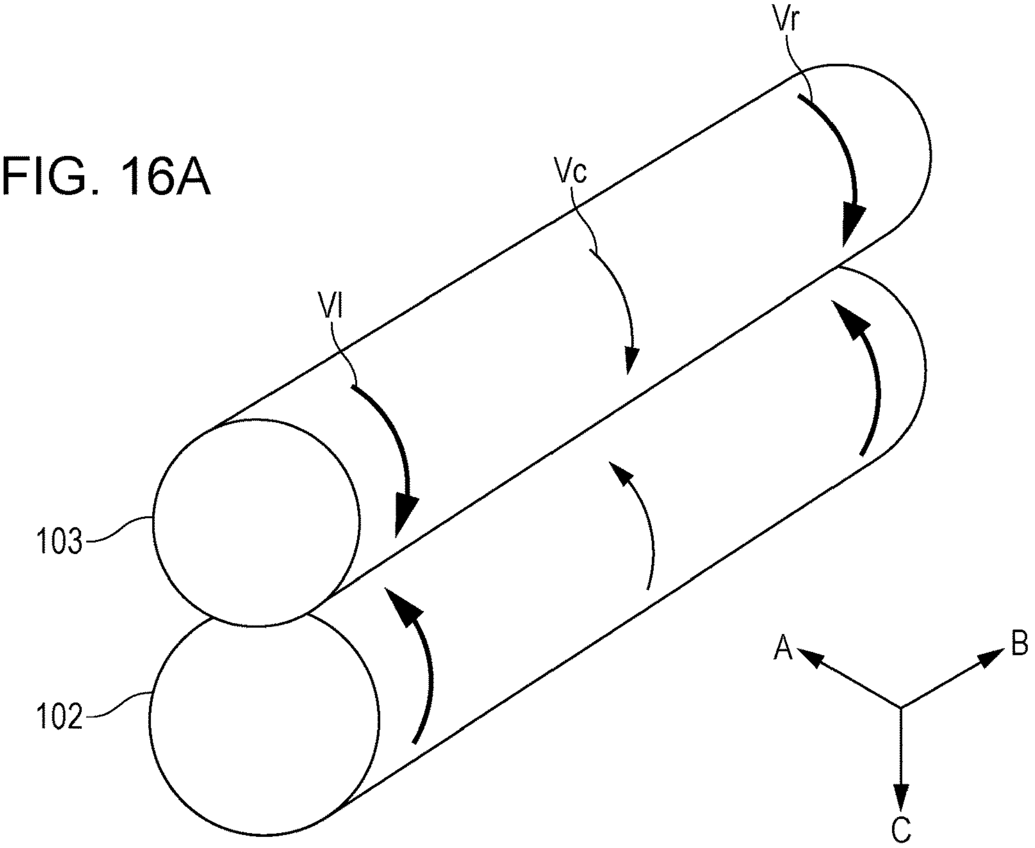
FIGS. 16A and 16B are views for explaining advantageous effects according to Example 5.

When small size sheets pass the longitudinal-center region successively, the temperatures of the film 103 and the pressure roller 102 increase in the non-sheet-passing region positioned near longitudinally opposite ends. This causes thermal expansion of an elastic layer 116 of the pressure roller and increases the outside diameter of the elastic layer 116 in the non-sheet-passing region. As illustrated in FIG. 16A, the speed Vr and the speed V1 of the film 103 at the longitudinal ends become greater than the speed Vc of the film 103 at the longitudinal center since the film 103 is passively rotated by the pressure roller 102.

Figure 19A:
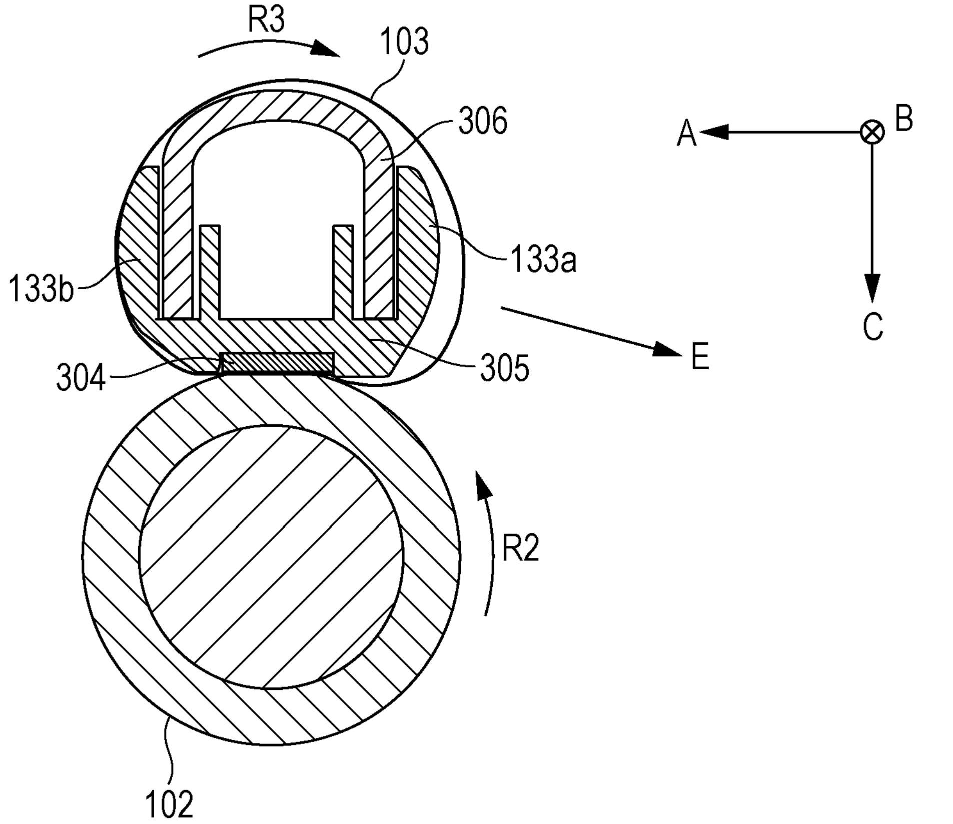
FIGS. 19A and 19B are diagrams illustrating a known heater holder.

Before describing the rotating shape of the film 103 of the present example when small size sheets pass successively, the rotating shape of the film 103 of the film unit 101 that does not include the film-deformation regulating member 307 is described first. FIG. 19A illustrates the rotating shape of the film 103 of a known fixing apparatus 10 at the longitudinal center when small size sheets are passing through. When small size sheets are passing, the longitudinal-center portion of the film 103 is positionally shifted upstream from the heater holder 305 in the conveyance direction of sheet S, which reduces the clearance between the film 103 and the downstream ribs 133*b*. This relates to the above-described temperature increase of the pressure roller 102 in the non-sheet-passing region when small size sheets are passing. When small size sheets are fed successively, the conveyance speed of the film 103 decreases at the center compared with the conveyance speed of the film 103 at both ends in the longitudinal direction B. As a result, as illustrated in FIG. 19A, the film 103 is positionally shifted upstream (in the direction of arrow E) in the conveyance direction A of sheet S. This occurs due to the film 103 receiving a force from a sheet S at the fixing nip Nf, the force acting in the direction opposite to the conveyance direction.

Figure 19B:
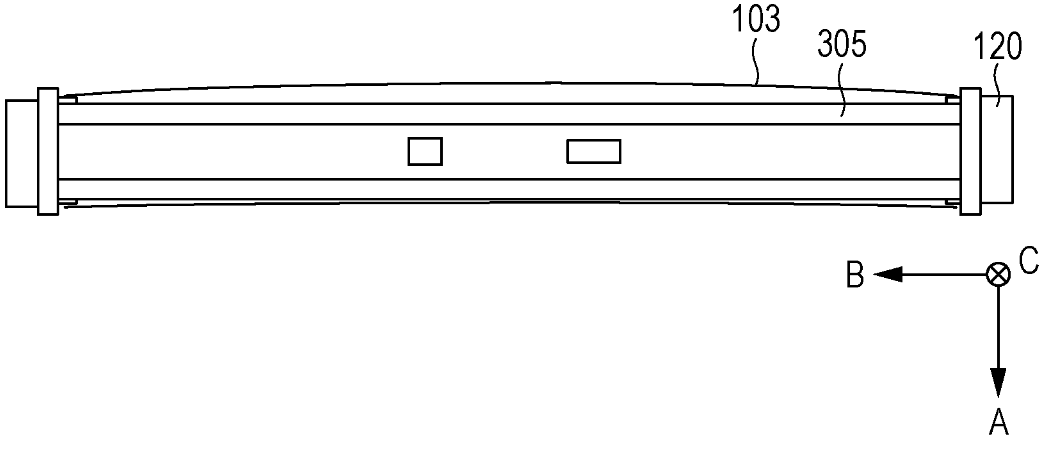

Next, the longitudinal shape of the film 103 is described with reference to FIG. 19B. The heater holder 305 is fixed to the flanges 120 at the longitudinal ends, and the flanges 120 are fixed to the right and left side plates 136 of the apparatus frame 135. Accordingly, the position of the heater holder 305 is not shifted upstream. On the other hand, the film 103 is warped and arched upstream in the conveyance direction of sheet S when small size sheets are passing, which is different from the situation when large size sheets pass.

Figure 16B:
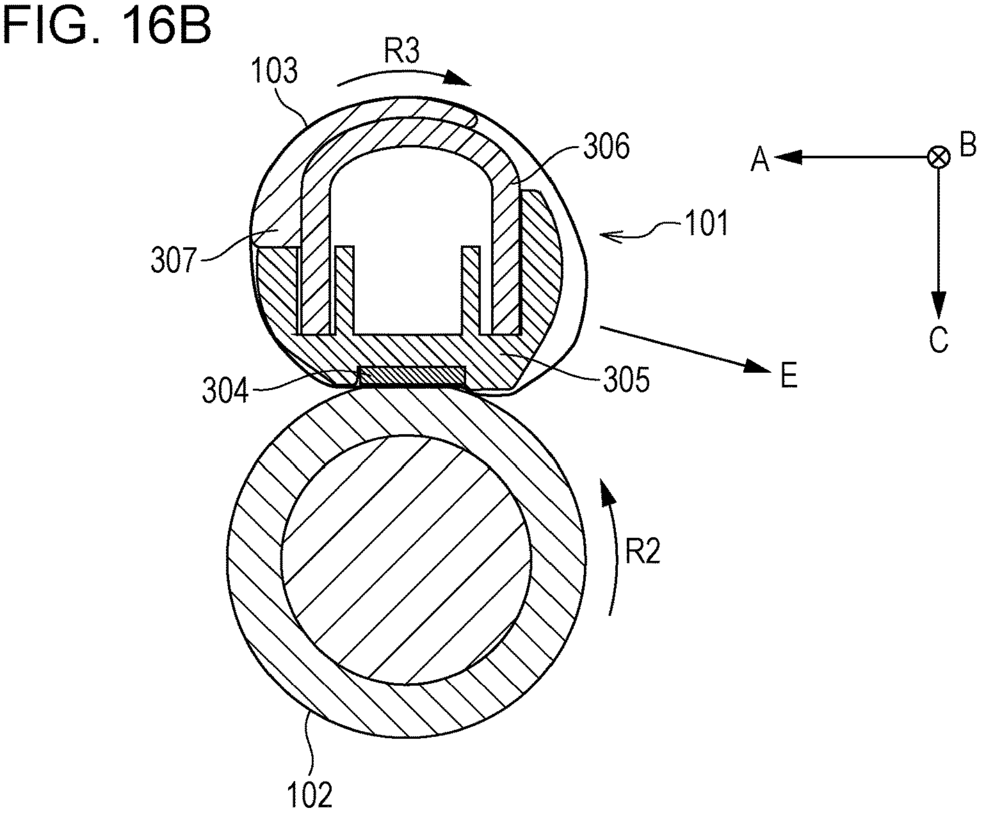

In contrast, the film 103 of the fixing apparatus of the present example behaves differently. FIG. 16B illustrates the behavior of the film 103 when small size sheets pass successively through the fixing apparatus of the present example. In the present example, the film-deformation regulating member 307 is present inside the film 103 being in steady rotation. When small size sheets are fed successively, the longitudinal-center portion of the film 103 is dragged upstream (in the direction of arrow E) as illustrated in FIG. 16B. In the present example, however, the film-deformation regulating member 307 is provided inside the film 103. When the film 103 is dragged upstream, the film-deformation regulating member 307 continuously supports the inside surface of the film 103 from a downstream part thereof in the conveyance direction to an upper part thereof positioned opposite to the fixing nip Nf and near the top of the stay member 306. As a result, the warping of the longitudinal-center portion of the film 103 on the upstream side in the conveyance direction can be reduced. Consequently, even if small size sheets are fed successively, sheet wrinkles caused by the warping of the film 103 can be prevented from occurring.

On the other hand, when large size sheets are fed, the warping of the film 103 does not occur. In this case, the film 103 maintains the shape as illustrated in FIG. 13B, in which the film 103 is in steady rotation while recording media P are not fed. Accordingly, when large size sheets are fed, a predetermined clearance provided between the inside surface of the film 103 and the film-deformation regulating member 307 reduces the occurrence of local temperature drops in the film 103, which leads to a reduction in the occurrence of fixation failure. The film-deformation regulating member 307 continuously supports the inside surface of the film 103 only when small size sheets are fed successively. Accordingly, the occurrence of sheet wrinkles can be reduced when small size sheets are fed successively.

In addition, the film-deformation regulating member 307 has the longer downstream portion compared with the upstream portion in the conveyance direction of recording medium, which can reduce heat removal from the film on the upstream side and thereby reduce the occurrence of fixation failure and of unevenness in gloss.

In the present example, a single film-deformation regulating member 307 is provided near the longitudinal center. However, multiple film-deformation regulating members 307 can be provided. It is desirable to provide at least one film-deformation regulating member 307 in a minimum sheet-passing width region. Alternatively, the maximum sheet-passing width region is divided into three parts, and the film-deformation regulating member 307 may be disposed at least in the central part, which can provide similar advantageous effects.

Example 6

Next, Example 6 of the present disclosure will be described. Example 6 is different from Example 1 in the number and the positions of film-deformation regulating members. Other structures of Example 6 are the same as those described in Example 1, and detailed descriptions of the image forming apparatus and the fixing apparatus will be omitted.

Features of Present Example

Figure 17:
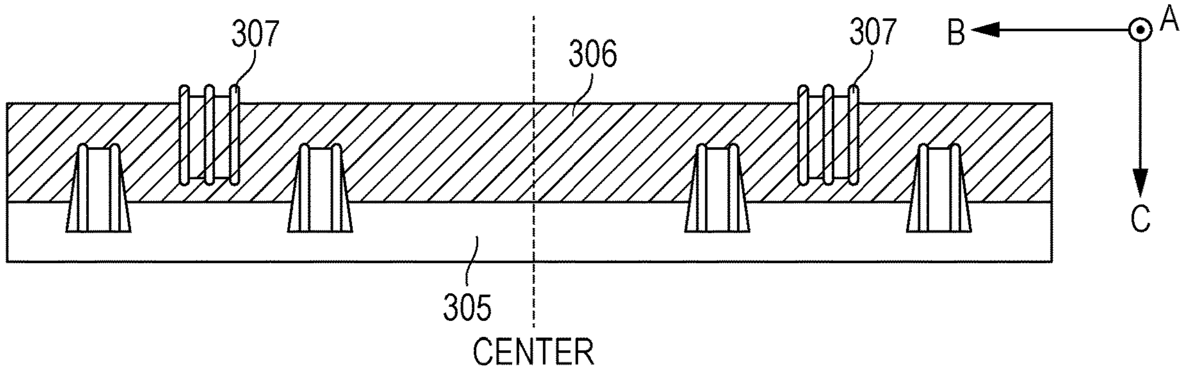
FIG. 17 is a view for explaining the positions of film-deformation regulating members according to Example 6.

The positions of the film-deformation regulating members 307 in the longitudinal direction are described with reference to FIG. 17. Only one film-deformation regulating member 307 is provided in Example 1, whereas in Example 6, two film-deformation regulating members 307 are disposed at symmetrical positions with respect to the longitudinal center. The distance between the longitudinal center and the center of a film-deformation regulating member 307 is set to be 26 mm.

Advantageous Effects of Present Example

Figure 18A:
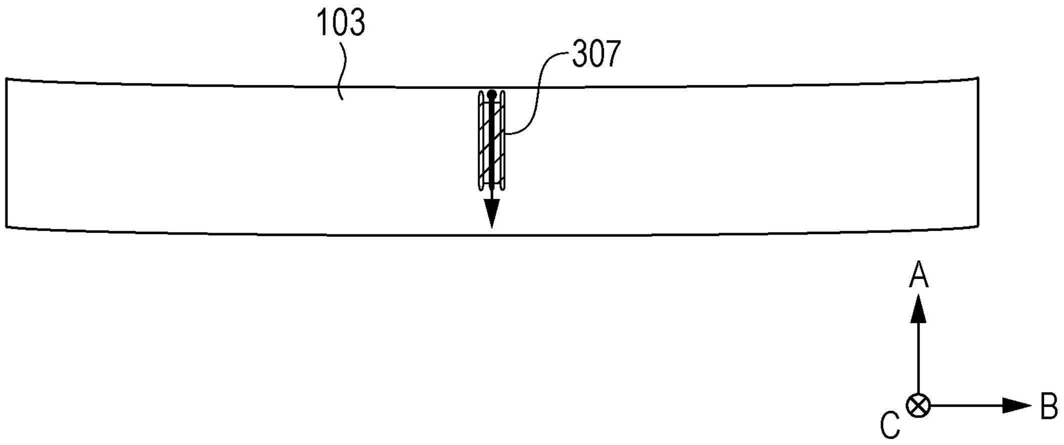
FIGS. 18A and 18B are views for explaining advantageous effects according to Example 6.
Figure 18B:
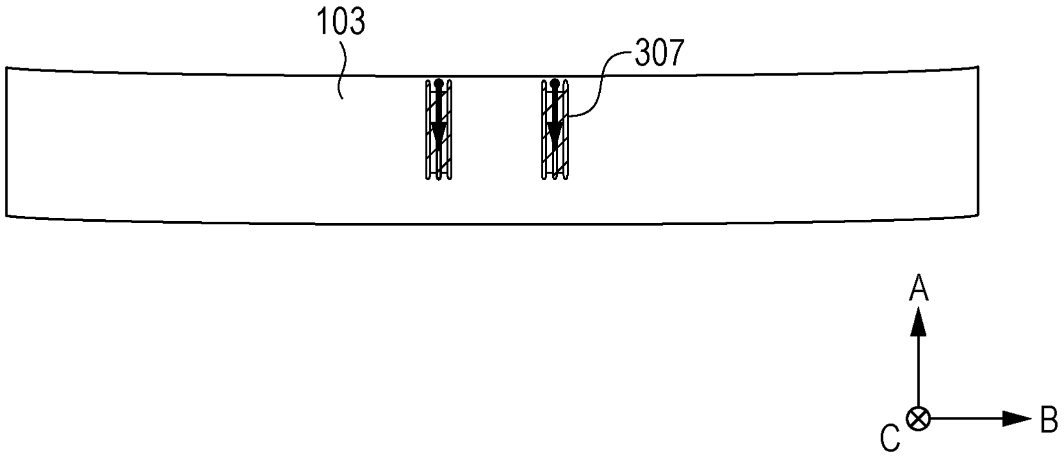

Advantageous effects of the present example are as follows. In Example 1, only one film-deformation regulating member 307 is provided in the longitudinal-center portion. When small size sheets are fed successively, the film-deformation regulating member 307 comes to support the inside surface of the film 103 at one position as illustrated in FIG. 18A. In this case, the film-deformation regulating member 307 causes a relatively strong force to act on the film 103. Depending on conditions of the film 103, such as the rigidity, the film 103 may deform locally near the contact point and may negatively affect, for example, conveyance of sheet S. In the present example, however, two film-deformation regulating member 307 are provided. When small size sheets are fed successively, the inside surface of the film 103 are supported at two contact points as illustrated in FIG. 18B.

Accordingly, the force acting on the inside surface of the film 103 are distributed in two contact points, which reduces the occurrence of local deformation of the film 103. As a result, the rotating shape of the film 103 is stabilized more, leading to prevention of sheet wrinkles.

Note that the film-deformation regulating member 307 is provided at two positions in the present example but may be provided at three positions or more.

Supplementary Note

The fixing apparatus according to the above embodiments at least includes the features listed below.

Item 1: A fixing apparatus includes: i) a tubular film configured to come into contact with a recording medium and rotate, ii) a guide member disposed in an inside space of the film, elongated in a generatrix direction of the film, and configured to guide rotation of the film, iii) a stay member disposed parallel to the generatrix direction of the film in the inside space thereof, the stay member reinforcing the guide member, and iv) a roller disposed so as to be in contact with the outside surface of the film. The film and the roller forms a fixing nip portion therebetween. The recording medium having a toner image formed thereon is heated to fix the toner image onto the recording medium at the fixing nip portion while the sheet passes through the fixing nip portion. The fixing apparatus further includes a restriction structure disposed at a position between opposite ends of the film in the generatrix direction. The restriction structure restricts movement of the guide member in a direction orthogonal to the generatrix direction of the film and in a direction in which the stay member and the guide member are separated from each other.

Item 2: In the fixing apparatus described in Item 1 above, the guide member and the stay member engage each other at a substantial center of the film in the generatrix direction, and the engagement restricts the movement of the guide member.

Item 3: In the fixing apparatus described in Items 1 and 2 above, the guide member and the stay member engage each other at least either at an upstream position or at a downstream position in a sheet conveyance direction that orthogonally intersects the generatrix direction of the film.

Item 4: The fixing apparatus described in Items 1 to 3 further includes an engagement member configured to engage the guide member and the stay member. The engagement member serves as the restriction structure.

Item 5: In the fixing apparatus described in Item 4 above, the engagement member engages the guide member substantially at a center of the film in the generatrix direction.

Item 6: In the fixing apparatus described in Items 4 and 5, the engagement member engages the guide member at least either at an upstream position or at a downstream position in the sheet conveyance direction that orthogonally intersects the generatrix direction of the film.

Item 7: In the fixing apparatus described in Items 4 to 6, the engagement member is a member configured to support the inside surface of the film.

Item 8: A film unit includes: i) a tubular film configured to come into contact with a recording medium and rotate, ii) a guide member disposed in an inside space of the film, elongated in a generatrix direction of the film, and configured to guide rotation of the film, iii) a stay member disposed parallel to the generatrix direction of the film in the inside space thereof, the stay member reinforcing the guide member, and iv) a restriction structure disposed at a position between opposite ends of the film in the generatrix direction. The restriction structure restricts movement of the guide member in a direction orthogonal to the generatrix direction of the film and in a direction in which the stay member and the guide member are separated from each other.

Item 9: In the film unit described in Item 8 above, the guide member and the stay member engage each other at a substantial center of the film in the generatrix direction, and the engagement restricts the movement of the guide member.

Item 10: In the film unit described in Items 8 and 9, the guide member and the stay member engage each other at least either at an upstream position or at a downstream position in a sheet conveyance direction that orthogonally intersects the generatrix direction of the film.

Item 11: The film unit described in Items 8 to 10 above further includes an engagement member configured to engage the guide member and the stay member. The engagement member serves as the restriction structure.

Item 12: In the film unit described in Item 11 above, the engagement member engages the guide member substantially at a center of the film in the generatrix direction.

Item 13: In the film unit described in Items 11 and 12, the engagement member engages the guide member at least either at an upstream position or at a downstream position in the sheet conveyance direction that orthogonally intersects the generatrix direction of the film.

Item 14: In the film unit described in Items 11 to 13 above, the engagement member is a member configured to support the inside surface of the film.

Item 15: A fixing apparatus includes: i) a tubular film configured to come into contact with a recording medium and rotate, ii) a heater disposed in an inside space of the film and configured to heat a recording medium, iii) a pressure roller configured to rotate and to form a nip portion in collaboration with the heater with the film interposed between the pressure roller and the heater, iv) a guide member disposed in the inside space of the film and configured to guide rotation of the film, the guide member having multiple ribs that are arrayed in a generatrix direction of the film and formed both on an upstream side and on a downstream side of the guide member with respect to the heater in a recording-medium conveyance direction, v) a stay member disposed parallel to the generatrix direction of the film in the inside space, the stay member reinforcing the guide member, and vi) a film-deformation regulating member that engages the stay member and that controls deformation of the film when the film deforms and the film-deformation regulating member comes into contact with the inside surface of the film. The recording medium having a toner image formed thereon is heated to fix the toner image onto the recording medium at the nip portion. As viewed in the generatrix direction, the film-deformation regulating member protrudes further downstream relative to the ribs on the downstream side in the recording-medium conveyance direction. When an imaginary line is drawn so as to pass through an rotation axis of the pressure roller and so as to extend in a direction orthogonal to a surface of the heater that opposes the pressure roller, a portion of the film-deformation regulating member positioned downstream from the imaginary line is longer in a film rotation direction than a portion of the film-deformation regulating member positioned upstream from the imaginary line.

Item 16: In the fixing apparatus described in Item 15 above, as viewed in the generatrix direction, the film-deformation regulating member does not overlap the ribs on the upstream side.

Item 17: In the fixing apparatus described in Items 15 and 16, as viewed in the generatrix direction, the film-deformation regulating member overlaps the ribs on the downstream side.

Item 18: The fixing apparatus described in Items 15 to 17 above further includes a plurality of the film-deformation regulating members that engage the stay member so as to be arrayed in the generatrix direction.

According to the present disclosure, the deformation of the fixing film can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2022-177774, filed Nov. 7, 2022 and No. 2022-177775, filed Nov. 7, 2022, which are hereby incorporated by reference herein in their entirety.

What is claimed is:

1. A fixing apparatus comprising:

a film that is tubular and configured to come into contact with a recording medium and rotate;

a guide member disposed in an inside space of the film, elongated in a generatrix direction of the film, and configured to hold a heater and guide rotation of the film;

a stay member disposed parallel to the generatrix direction of the film in the inside space of the film;

a roller disposed so as to be in contact with an outside surface of the film; and a restriction structure disposed at a position between opposite ends of the film in the generatrix direction, and configured to engage the guide member and the stay member, wherein the stay member is configured to reinforce the guide member, the film and the roller forms a fixing nip portion between the film and the roller, and the recording medium, having a toner image formed on the recording medium, is heated to fix the toner image onto the recording medium at the fixing nip portion while the recording medium passes through the fixing nip portion, wherein the restriction structure is configured to restrict movement of the guide member in a direction orthogonal to the generatrix direction of the film and also in a direction in which the stay member and the guide member are separated from each other.

2. The fixing apparatus according to claim 1, wherein the guide member and the stay member are configured to engage each other at a substantial center of the film in the generatrix direction, and the engagement restricts the movement of the guide member.

3. The fixing apparatus according to claim 2, wherein the guide member and the stay member engage each other at least either at an upstream position or at a downstream position in a recording medium conveyance direction that orthogonally intersects the generatrix direction of the film.

4. The fixing apparatus according to claim 1, further comprising an engagement member, wherein the engagement member serves as the restriction structure.

5. The fixing apparatus according to claim 4, wherein the engagement member is configured to engage the guide member substantially at a center of the film in the generatrix direction.

6. The fixing apparatus according to claim 5, wherein the engagement member is configured to engage the guide member at least either at an upstream position or at a downstream position in a recording medium conveyance direction that orthogonally intersects the generatrix direction of the film.

7. The fixing apparatus according to claim 4, wherein the engagement member is a member configured to support an inside surface of the film.

8. A fixing apparatus film unit comprising:

a film that is tubular and configured to come into contact with a recording medium and rotate;

a guide member disposed in an inside space of the film, elongated in a generatrix direction of the film, and configured to hold a heater and guide rotation of the film;

a stay member disposed parallel to the generatrix direction of the film in the inside space of the film; and a restriction structure disposed at a position between opposite ends of the film in the generatrix direction, and configured to engage the guide member and the stay member, wherein the restriction structure is configured to restrict movement of the guide member in a direction orthogonal to the generatrix direction of the film and also in a direction in which the stay member and the guide member are separated from each other.

9. The fixing apparatus film unit according to claim 8, wherein the guide member and the stay member are configured to engage each other at a substantial center of the film in the generatrix direction, and the engagement restricts the movement of the guide member.

10. The fixing apparatus film unit according to claim 9, wherein the guide member and the stay member engage each other at least either at an upstream position or at a downstream position in a recording medium conveyance direction that orthogonally intersects the generatrix direction of the film.

11. The fixing apparatus film unit according to claim 8, further comprising an engagement member, wherein the engagement member serves as the restriction structure.

12. The fixing apparatus film unit according to claim 11, wherein the engagement member is configured to engage the guide member substantially at a center of the film in the generatrix direction.

13. The fixing apparatus film unit according to claim 12, wherein the engagement member is configured to engage the guide member at least either at an upstream position or at a downstream position in a recording medium conveyance direction that orthogonally intersects the generatrix direction of the film.

14. The fixing apparatus film unit according to claim 11, wherein the engagement member is a member configured to support an inside surface of the film.

15. A fixing apparatus comprising:

a film that is tubular and configured to come into contact with a recording medium and rotate;

a guide member disposed in an inside space of the film, elongated in a generatrix direction of the film, and configured to hold a heater and guide rotation of the film;

a stay member disposed parallel to the generatrix direction of the film in the inside space of the film;

a roller disposed so as to be in contact with an outside surface of the film;

a restriction structure disposed at a position between opposite ends of the film in the generatrix direction; and an engagement member configured to engage the guide member and the stay member, wherein the stay member is configured to reinforce the guide member, the film and the roller forms a fixing nip portion between the film and the roller, and the recording medium, having a toner image formed on the recording medium, is heated to fix the toner image onto the recording medium at the fixing nip portion while the recording medium passes through the fixing nip portion, wherein the restriction structure is configured to restrict movement of the guide member in a direction orthogonal to the generatrix direction of the film and also in a direction in which the stay member and the guide member are separated from each other, wherein one end of the engagement member is connected to the stay member, and an opposite end of the engagement member is connected to the guide member; and wherein the engagement member serves as the restriction structure.

16. A fixing apparatus comprising:

a film that is tubular and configured to come into contact with a recording medium and rotate;

a guide member disposed in an inside space of the film, elongated in a generatrix direction of the film, and configured to guide rotation of the film;

a stay member disposed parallel to the generatrix direction of the film in the inside space of the film;

a roller disposed so as to be in contact with an outside surface of the film;

a restriction structure disposed at a position between opposite ends of the film in the generatrix direction; and an engagement member configured to engage the guide member and the stay member, wherein the stay member is configured to reinforce the guide member, the film and the roller forms a fixing nip portion between the film and the roller, and the recording medium, having a toner image formed on the recording medium, is heated to fix the toner image onto the recording medium at the fixing nip portion while the recording medium passes through the fixing nip portion, wherein the restriction structure is configured to restrict movement of the guide member in a direction orthogonal to the generatrix direction of the film and also in a direction in which the stay member and the guide member are separated from each other, wherein the engagement member serves as the restriction structure, and wherein the engagement member is a member configured to be in contact with an inside surface of the film.

17. A fixing apparatus film unit comprising:

a film that is tubular and configured to come into contact with a recording medium and rotate;

a guide member disposed in an inside space of the film, elongated in a generatrix direction of the film, and configured to hold a heater and guide rotation of the film;

a stay member disposed parallel to the generatrix direction of the film in the inside space of the film;

a restriction structure disposed at a position between opposite ends of the film in the generatrix direction; and an engagement member configured to engage the guide member and the stay member, wherein the restriction structure is configured to restrict movement of the guide member in a direction orthogonal to the generatrix direction of the film and also in a direction in which the stay member and the guide member are separated from each other, wherein one end of the engagement member is connected to the stay member, and an opposite end of the engagement member is connected to the guide member; and wherein the engagement member serves as the restriction structure.

18. A fixing apparatus film unit comprising:

a film that is tubular and configured to come into contact with a recording medium and rotate;

a guide member disposed in an inside space of the film, elongated in a generatrix direction of the film, and configured to guide rotation of the film;

a stay member disposed parallel to the generatrix direction of the film in the inside space of the film;

a restriction structure disposed at a position between opposite ends of the film in the generatrix direction; and an engagement member configured to engage the guide member and the stay member, wherein the restriction structure is configured to restrict movement of the guide member in a direction orthogonal to the generatrix direction of the film and also in a direction in which the stay member and the guide member are separated from each other, wherein the engagement member serves as the restriction structure, and wherein the engagement member is a member configured to be in contact with an inside surface of the film.

* * * * *